United States Patent [19]

Saito

[11] Patent Number: 5,790,700

[45] Date of Patent: Aug. 4, 1998

[54] METHOD FOR AUTOMATICALLY RECOGNIZING LINE SYMMETRY OF A FIGURE

[75] Inventor: Shigeru Saito, Tokyo, Japan

[73] Assignee: NEC Corporation, Tokyo, Japan

[21] Appl. No.: 603,449

[22] Filed: Feb. 20, 1996

[30] Foreign Application Priority Data

Feb. 20, 1995 [JP] Japan ..................................... 7-054961

[51] Int. Cl.$^6$ .............................. G06K 9/46; G06T 11/00; G06T 3/20
[52] U.S. Cl. ........................ 382/203; 345/433; 345/438
[58] Field of Search ................................ 345/433, 438, 345/441, 443, 442, 468; 382/203

[56] References Cited

U.S. PATENT DOCUMENTS 4,797,842  1/1989  Nackman et al. ...................... 364/578

FOREIGN PATENT DOCUMENTS 62-111369  5/1987  Japan .
63-261481  10/1988  Japan .

Primary Examiner—Leo H. Boudreau
Assistant Examiner—Nhan Le
Attorney, Agent, or Firm—Foley & Lardner

[57] ABSTRACT

In a line-symmetrical figure shaping system, the symmetry axis candidate pairs of an input figure are generated based on feature data extracted from the input figure. Pairs of points on the input figure on both sides of each of two symmetry axis candidates of a selected symmetry axis candidate are extracted, and a symmetry axis judgment segment is generated which connects the points of each pair. The distance between the middle point of the symmetry judgment segment and the symmetry axis candidate is calculated. The angle formed by the symmetry judgment segment and the symmetry axis candidate and the difference from 90° are also calculated. Based on the distances and angular differences for the respective symmetry judgment segments, it is judged whether the input figure is symmetrical with respect to the symmetry axis candidate pair. The input figure is shaped into a figure that is completely line-symmetrical with respect to the symmetry axis candidate pair that has been judged to provide line symmetry.

44 Claims, 22 Drawing Sheets

METHOD FOR AUTOMATICALLY RECOGNIZING LINE SYMMETRY OF A FIGURE

BACKGROUND OF THE INVENTION

1. Field of the Invention

The present invention relates to a figure shaping system and, more specifically, to a line-symmetrical figure shaping method and system which generates orthogonal line-symmetry axes from an input figure and shapes the input figure into a figure that is line-symmetrical with respect to the generated orthogonal axes.

2. Description of the Related Art

In manually drawing a figure through a keyboard or with a mouse, a pen, or the like by using a drawing processor such as a word processor or a personal computer, a rough figure can be generated easily but it is laborious to draws for instance, a figure that is line-symmetrical with respect to a certain axis. To draw a figure of the latter type, it will be helpful if there exists a figure processor that, by itself, recognizes the symmetry of an input figure and automatically corrects it into a line-symmetrical figure. However, at present, no figure processor having such a function is known. Therefore, the development of a line-symmetrical figure shaping apparatus which generates a single line-symmetry axis from an input figure and shapes the input figure into a figure that is line-symmetrical with respect to the generated axis is now desired eagerly.

To realize such a line-symmetrical figure shaping apparatus, it is prerequisite to provide a function of automatically recognize the line symmetry of an input figure. Conventionally, there are known the following methods of recognizing the symmetry of an input figure.

According to a first conventional method, a symbol table is prepared which defines whether each symbol is symmetrical. An input figure is recognized by pattern matching, feature matching, or the like, and it is determined which of the symbols is identical with the input figure. If it becomes apparent by referring to the symbols table that the identified symbol is symmetrical, the input figure is recognized as being symmetrical. (See Japanese Patent Application Laid-open No. 62-111369.) This method will be described below in more detail with reference to a flowchart of FIG. 1.

In FIG. 1, a recognition object image (symbol element) is subjected to recognition processing such as a pattern matching method (step V1), and a recognition result $1a$ is generated that indicates which of the predetermined symbols is identical with the object image (step V2). Then, reference is made to a symbol table that defines whether each symbol is symmetrical. If the symbol of the recognition result $1a$ is defined as being symmetrical, the object image is judged to be symmetrical. Otherwise, the object image is judged to be unsymmetrical (step V3).

When the object image is judged to be symmetrical, the following process is executed, because a single reading operation may cause erroneous recognition at a high probability. First, the object image that has been judged to be symmetrical is symmetrically transformed (step V4), and the transformed object figure is again subjected to the recognition processing (steps V5 and V6). A current recognition result $2a$ is compared with the previous recognition result $1a$ (step V7). If they are identical, the recognition result $1a$ is output as a result of the process (step V8). If they are not identical, the object image is rejected as being impossible to recognize (step V9).

According to a second conventional method, a symmetry axis candidate segment (center line) that is drawn in an input figure and will possibly become a symmetry axis is extracted. If all the segments drawn from the respective apexes of the input figure perpendicularly to the symmetry axis candidate segment are approximately equally divided by the symmetry axis candidate segment, the input figure is judged to be symmetrical. (See Japanese Patent Application Laid-Open No. 63-261481.) The technique described in this publication will be explained below with reference to FIGS. 2 and 3.

First, image data is converted into vector data by polygonal line approximation. The vector data is classified as one of a symbol, a character, and line segments, and then classified into configurational lines, center lines, and other lines. Further, distinction between a character and a symbol is made, and the vector data is stored with an attribute based on a discrimination result attached thereto.

Next, the recognition result data is loaded (step W1). Center lines that will possibly become a symmetry axis are extracted from the data, and are counted (step W2). It is checked for each of the extracted center lines whether there exists a configurational line that intersects the center line or configurational lines that are isolated from it on both sides in the vertical or horizontal direction (step W3). If a center line that intersects a configurational line or has isolated configurational lines on both sides ("present" in step W4), the symmetry of the configurational line or the isolated configurational lines is checked (step W5).

A method of judging the symmetry will be described with reference to FIG. 3. For example, a perpendicular L2 is drawn from an end point P2 of a vector to a center line b, and a distance l2 between the end point P2 and the center line b is calculated. Further, a distance m2 between the center line b and an intersection X2 of an extension of the perpendicular L2 and a vector c is calculated. And then a difference between the distances l2 and m2 is calculated. If a relationship $$|l2-m2|<\Delta\tfrac{1}{2} \qquad (1)$$

is satisfied where $\Delta\tfrac{1}{2}$ is a given threshold, then similar calculation is performed on the other end points. If the inequality (1) is satisfied for all the end points and the sum of the differences in distance (an integer number: n ranges from 1 to the number of all the end points) satisfies the following inequality:

$$\Sigma|ln-mn|<Q \qquad (2)$$

where Q is a given threshold, then the configurational lines concerned are judged to be symmetrical ("symmetrical" in step W6). After the symmetry judgment is performed on all the center lines, abbreviated drawing information is set based on part of drawing information attached to the symmetrical configurational lines (step W7).

As described above, recognizing the symmetry of an input figure is performed conventionally. However, in the first conventional method, it is necessary to define all the figures that should be judged to be symmetrical and register those figures in a symbol table in advance. Therefore, the symmetry judgment cannot be performed when an undefined object figure is input.

In contrast, in the second conventional method, it is not necessary to define figures that should be judged to be symmetrical, because symmetry axis candidate segments (center lines) that are drawn in an input figure and will possibly become a symmetry axis are extracted and, in the following processing, the symmetry judgment is conducted by using those extracted symmetry axis candidate segments. However, since symmetry axis candidate segments such as center lines drawn in an input figure need to be extracted, this method cannot accommodate a case where no such symmetry axis candidate segment is drawn in the input figure. In inputting a figure, a user is required to write its symmetry axis separately.

SUMMARY OF THE INVENTION

An object of the present invention is to provide a method for automatically extracting orthogonal symmetry axes from a figure that has been drawn by a user without any restriction on its form and without considering its symmetry axes.

Another object of the present invention is to provide a line-symmetrical figure shaping system and method which automatically extracts orthogonal symmetry axes from a figure that has been drawn by a user without any restriction on its form and without considering its symmetry axes, and shapes the input figure into a figure that is line-symmetrical with respect to the orthogonal symmetry axes.

According to an aspect of the invention, the symmetry axis candidate pairs each of which will possibly become orthogonal symmetry axes of an input figure are generated from feature data such as coordinates of apexes of the input figure. A single symmetry axis candidate pair to become actual orthogonal symmetry axes is determined from those candidate pairs, and the input figure is shaped into a completely symmetrical figure by using the symmetry axis pair thus determined.

More specifically, after the feature data is extracted from the input figure, it is judged whether the number of the apexes is an even number. If the number of the apexes is an even number, there are possibilities that a pair of orthogonal symmetry axes exists in the input figure. Therefore, first, symmetry axis candidate pairs are generated based on the feature data, where each of the symmetry axis candidate pairs comprise two symmetry axis candidates which possibly become orthogonal to each other. Subsequently, symmetry axis judgment segments are generated each connecting each of pairs of points on the input figure on both sides of each of the two symmetry axis candidates of a selected symmetry axis candidate pair which is selected one by one from the symmetry axis candidate pairs. For each of the two symmetry axis candidates of a selected symmetry axis candidate pair, distance differences between one of the two symmetry axis candidates and middle points of the symmetry judgment segments generated for the one of the two symmetry axis candidates of the selected symmetry axis candidate pair, respectively, and angular differences between a right angle and angles which the symmetry judgment segments generated for the one of the two symmetry axis candidates form with the one of the two symmetry axis candidates, respectively, are calculated. It is then judged whether the input figure is approximately symmetrical with respect to the two symmetry axis candidates based on the distance differences and the angular differences. When the input figure is judged to be symmetrical with respect to the two symmetry axis candidates, the input figure is symmetrized such that the input figure becomes completely line-symmetrical with respect to the two symmetry axis candidates.

Therefore, an arbitrary figure that has been drawn by a user without considering its symmetry axis can be automatically shaped into a figure that is line-symmetrical with respect to the respective orthogonal symmetry axes of the determined symmetry axis pair.

It is preferable to use, as a symmetry axis pair, a symmetry axis candidate pair that is first judged to provide line symmetry. Further, if a symmetry axis candidate pair that appears horizontal and vertical on the display screen is processed with preference, a figure that is line-symmetrical with respect to that symmetry axis candidate pair can be generated efficiently with preference given thereto. Furthermore, in cases where the shaping is performed by selecting the most suitable symmetry axis candidate pair as a symmetry axis pair, a line-symmetrical figure that is closest to an input figure can be obtained.

According to another aspect of the present invention, each time a distance and an angular difference are calculated for one symmetry judgment segment, it is judged whether the calculated distance and angular difference are smaller than respective given thresholds. If they are smaller than the given thresholds, the calculation of a distance and an angular difference is continued for the remaining symmetry judgment segments with a judgment that it is highly probable that the current symmetry judgment segment is symmetrical with the symmetry axis candidate concerned. On the other hand, if at least one of the distance and the angular difference exceeds the given threshold, the input figure is judged to be unsymmetrical with respect to the symmetry axis candidate pair concerned. In this case, the processing on the symmetry axis candidate concerned is stopped to start processing on the new symmetry axis candidate pair. Therefore, faster processing speed can be provided because it can discard a symmetry axis candidate pair that does not provide symmetry at an early stage.

An one-axis symmetrizing step is preferably used to shape an input figure into a line-symmetrical figure with respect to one symmetry axis candidate even whether the input figure is not symmetrical with respect to a symmetry axis candidate pair, resulting in increased number of figures that can be shaped into a line-symmetrical figure.

DETAILED DESCRIPTION OF THE PREFERRED EMBODIMENTS

Embodiments of the present invention will be hereinafter described in detail with reference the accompanying drawings.

First Embodiment

Figure 1:
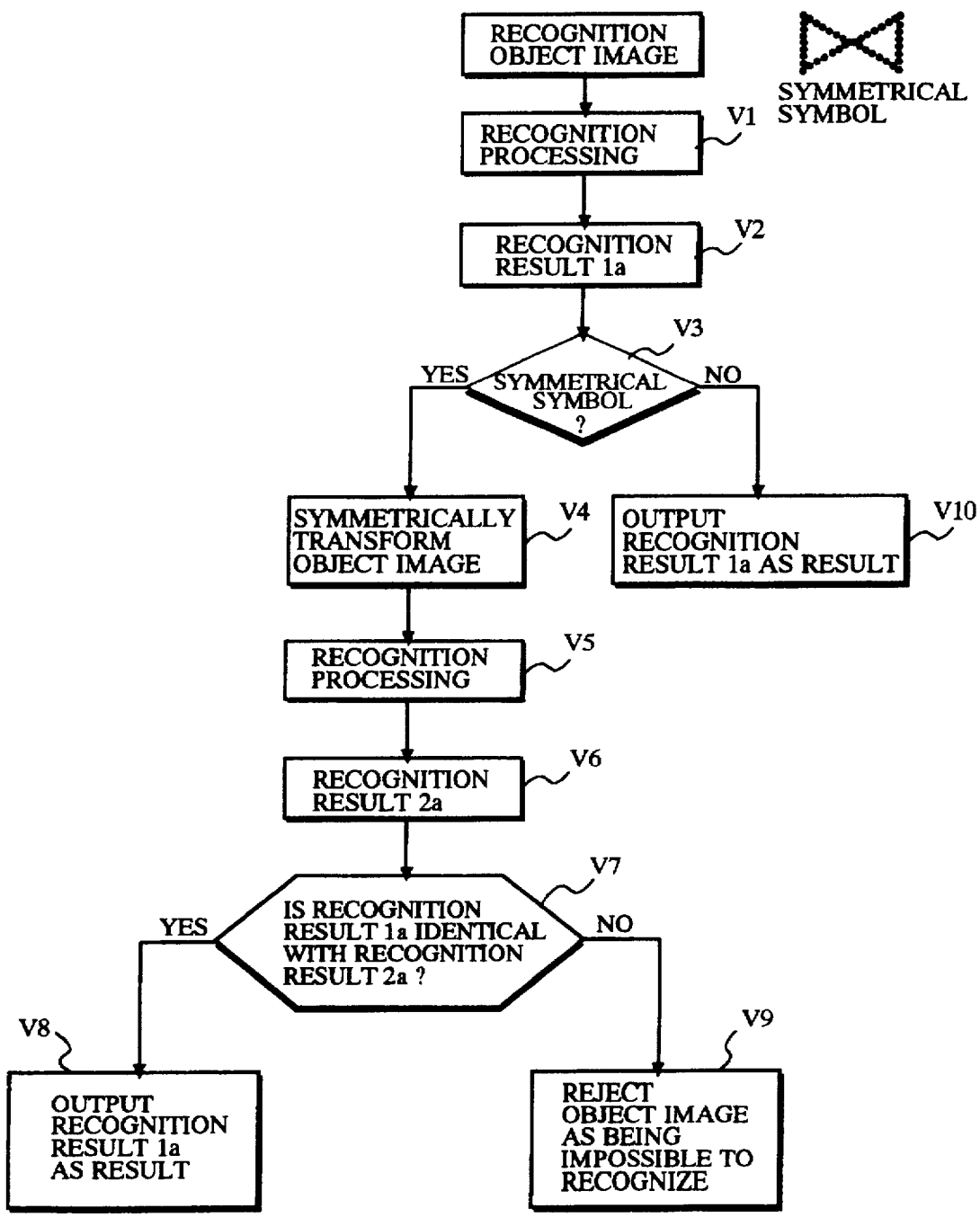
FIG. 1 is a block diagram showing a flowchart showing a first conventional process.
Figure 2:
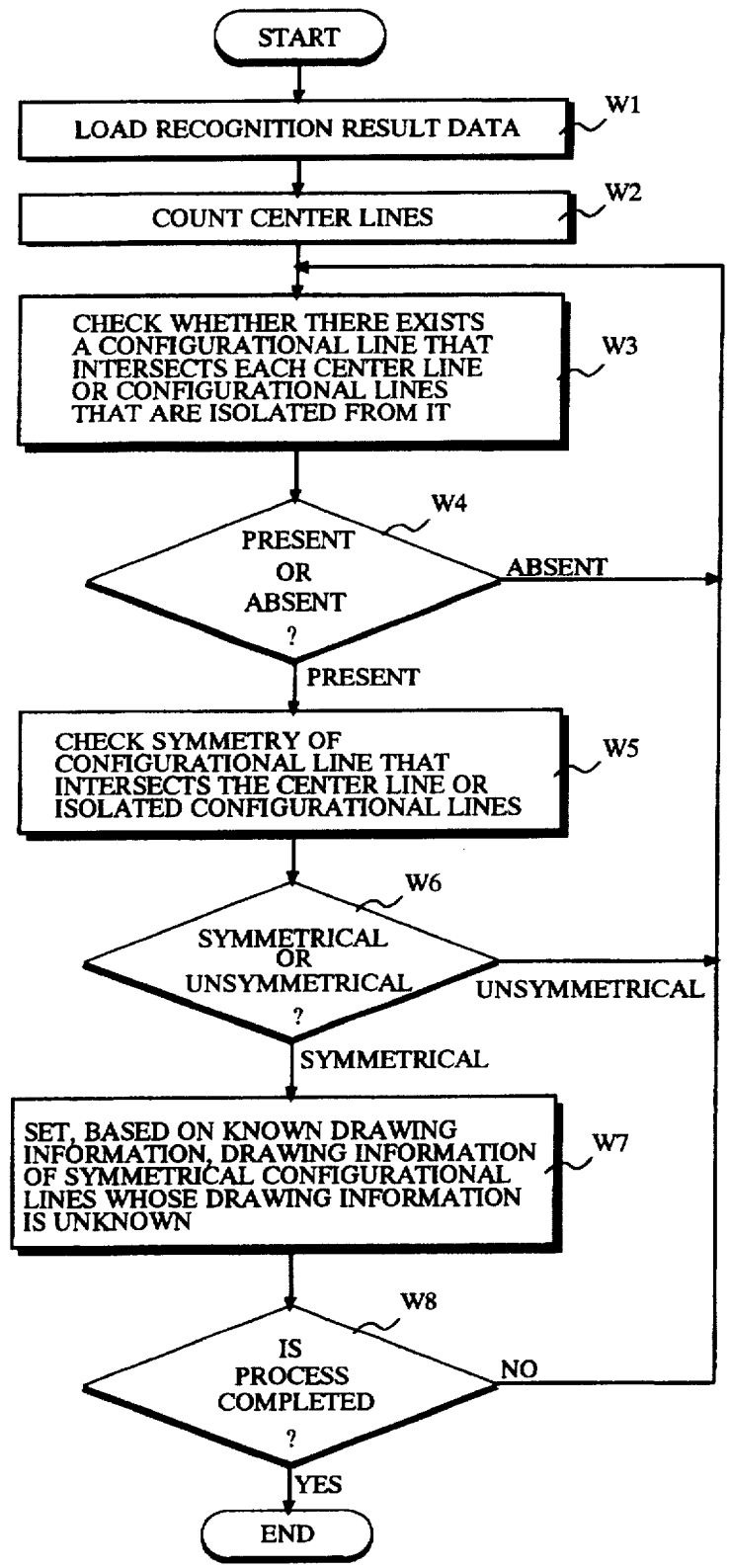
FIG. 2 is a flowchart showing a second conventional process.
Figure 3:
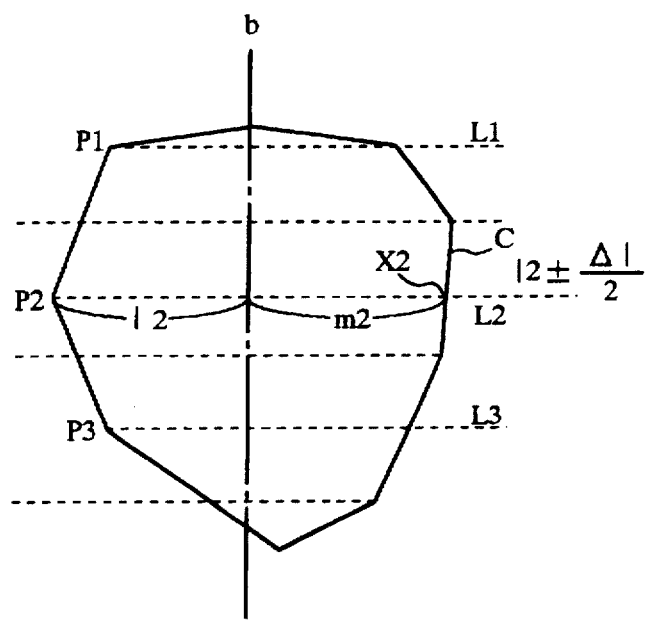
FIG. 3 illustrates a symmetry judging method of the second conventional method.
Figure 4:
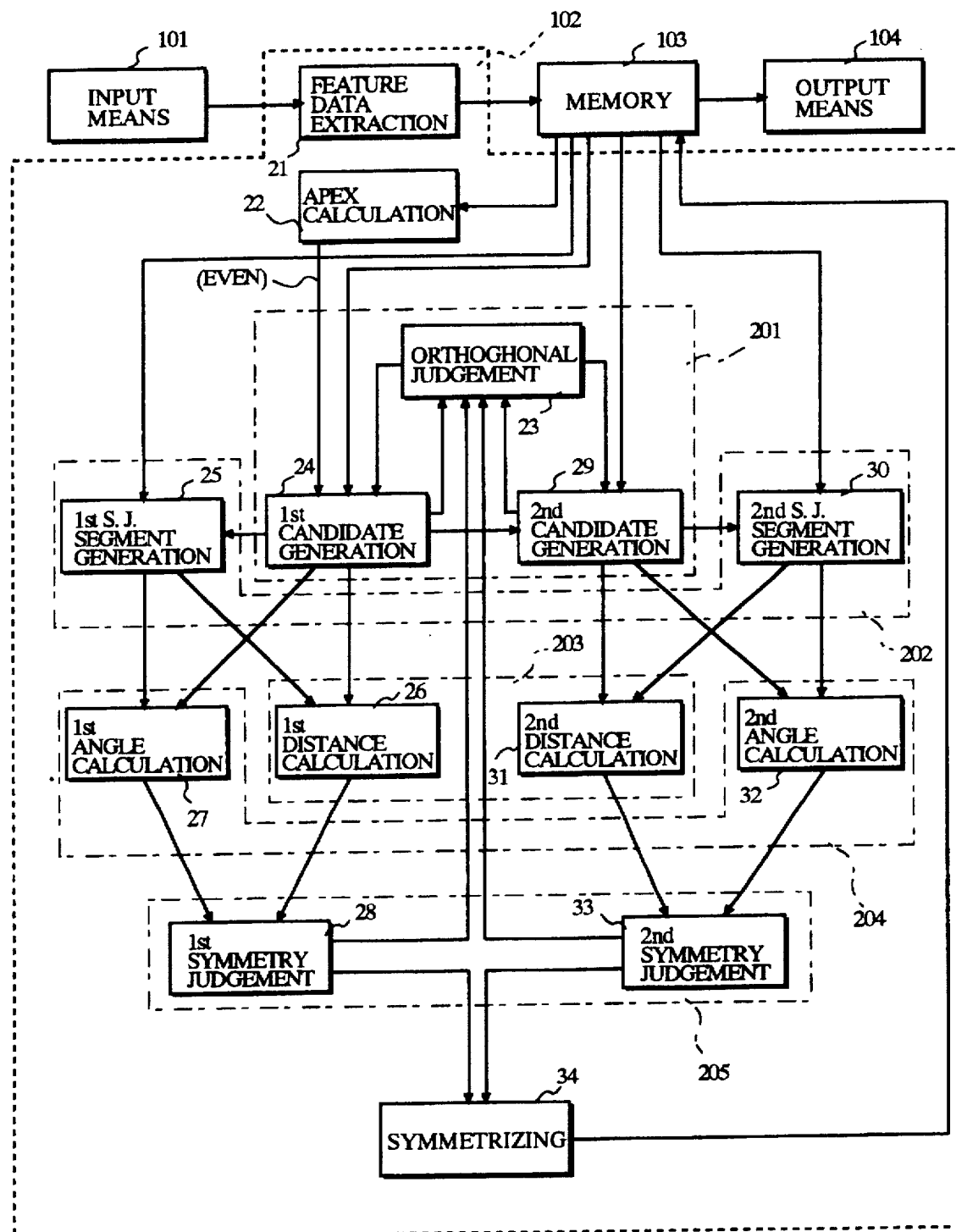
FIG. 4 is a functional block diagram showing a line-symmetrical figure shaping system according to a first embodiment of the present invention.

Referring to FIG. 4, a line-symmetrical figure shaping system according to a first embodiment of the invention is composed of the following components. An input means 101 allows a user to input a figure (e.g. a polygon) onto the screen of a display device through a keyboard or with a mouse, a pen, or the like. A data processing device 102 operates in program control. A memory 103 stores figure information and feature data. An output means 104 reproduces a figure based on the feature data, and supplies it to a display device (not shown). The data processing device 102, which is implemented as a DSP, for instance, has the following functions.

Feature data such as coordinates of apexes and lengths of sides are extracted from an input figure (feature data extraction means 21), and stored onto the memory 103. Using the feature data stored in the memory 103, the number of apexes of the input figure is calculated and then it is determined whether the number of apexes is even (number-of-apexes calculation means 22). All symmetry axis candidate pairs that will possibly become orthogonal symmetry axes of the figure are generated based on the feature data (orthogonal symmetry axis candidate generation means 201). The symmetry axis candidate pairs are processed one by one in the following manner. To judge the symmetry of one candidate pair of orthogonal symmetry axes, plural pairs of apexes are selected and a symmetry judgment segment that connects the apexes of each pair is generated (symmetry judgment segment generation means 202). The distance between the middle point of a symmetry judgment segment and a symmetry axis candidate is calculated (symmetry axis distance calculation means 203). Further, the angle formed by the symmetry judgment segment and the symmetry axis candidate is calculated, and its difference from 90° is calculated (symmetry axis angle calculation 204). Based on the distances and the angular differences that have been calculated for the respective symmetry judgment segments, it is judged whether the input figure is line-symmetrical with respect to the symmetry axis candidate concerned (symmetry judgment means 205). If the input figure is judged to be line-symmetrical with respect to the symmetry axis candidate, the symmetry candidate pair is used as the orthogonal symmetry axis pair. On the other hand, if not line-symmetrical with respect to the symmetry axis candidate, a subsequent symmetry axis candidate pair is generated by the orthogonal symmetry axis candidate generation function 201. If the input figure is judged to be line-symmetrical, the feature data that are stored in the memory 103 are altered so as to represent a figure that is completely symmetrical with respect to the orthogonal symmetry axis pair (symmetrizing processing means 34).

Since respective orthogonal symmetry axes are processed, some function means have subfunction means included as follows. The orthogonal symmetry axis candidate generation means 201 includes an orthogonal judgment means 23, a first symmetry axis candidate generation means 24, and a second symmetry axis candidate generation means 29. The symmetry judgment segment generation means 202 includes a first symmetry judgment (s.j.) segment generation means 25 and a second symmetry judgment (s. j.) segment generation means 30. The symmetry axis distance calculation means 203 includes a first symmetry axis distance calculation means 26 and a second symmetry axis distance calculation means 31. The symmetry axis angle calculation means 204 includes a first symmetry axis angle calculation means 27 and a second symmetry axis angle calculation means 32. Finally, the symmetry judgment function means 205 includes a first symmetry judgment means 28 and a second symmetry judgment means 33.

From another point of view, the data processing device 102 includes a first processing system and a second processing system. The first processing system consists of the first symmetry axis candidate generation means 24, the first symmetry judgment segment generation means 25, the first symmetry axis distance calculation means 26, the first symmetry axis angle calculation means 27, and the first symmetry judgment means 28. The second processing system consists of the second symmetry axis candidate generation means 29, the second symmetry judgment segment generation means 30, the second symmetry axis distance calculation means 31, the second symmetry axis angle calculation means 32, and the second symmetry judgment means 33.

The first symmetry axis candidate generation means 24 generates first symmetry axis candidates which will possibly become a symmetry axis of the input figure based on the feature data stored in the memory 103 at the time when the number of apexes of the input figure is determined to be an even number by the number-of-apexes calculation means 22, and then outputs the first symmetry axis candidates one by one to the orthogonal judgment means 23 and the second symmetry axis candidate generation means 29. Receiving orthogonal symmetry axis candidates one by one from the orthogonal judgment means 23, the received orthogonal symmetry axis candidate is output as one symmetry axis candidate of an orthogonal symmetry candidate pair which is to be processed this time to the first symmetry judgment segment generation 25, the first symmetry axis distance calculation 26, and the first symmetry axis angle calculation 27.

Receiving the respective first symmetry axis candidates from the first symmetry axis candidate generation means 24, the second symmetry axis candidate generation means 29 generates second symmetry axis candidates approximately orthogonal to the respective first symmetry axis candidates based on the feature data stored in the memory 103, and then outputs the second symmetry axis candidates one by one to the orthogonal judgment means 23. Receiving symmetry axis candidates one by one from the orthogonal judgment means 23, a received symmetry axis candidate is output as the other symmetry axis candidate of the orthogonal symmetry candidate pair which is to be processed this time to the second symmetry judgment segment generation 30, the second symmetry axis distance calculation 31, and the second symmetry axis angle calculation 32.

The orthogonal judgment means 23 receives all symmetry axis candidate pairs of the first and second symmetry axis candidates from the first symmetry axis candidate generation means 24 and the second symmetry axis candidate generation means 29, and then selects orthogonal symmetry axis candidate pairs on condition that an angle formed by a first and a second symmetry axis candidates falls within a predetermined range in close vicinity to 90°. The first symmetry axis candidate and the second symmetry axis candidate which are judged to be approximately orthogonal to each other by the orthogonal judgment means 23 are supplied to the first process system and the second process system, respectively.

In the symmetry judgment segment generation means 202, the first symmetry judgment segment generation means 25 generates first symmetry judgment segments which are used to judge whether a single first symmetry axis candidate received from the first symmetry axis candidate generation means 24 provides line symmetry. The second symmetry judgment segment generation means 30 generates second symmetry judgment segments which are used to judge whether a single second symmetry axis candidate received from the second symmetry axis candidate generation means 29 provides line symmetry.

In the symmetry axis distance calculation means 203, the first symmetry axis distance calculation means 26 calculates the first distance difference between the middle point of each first symmetry judgment segment and the first symmetry axis candidate. The second symmetry axis distance calculation means 31 calculates the second distance difference between the middle point of each second symmetry judgment segment and the second symmetry axis candidate.

In the symmetry axis angle calculation means 204, the first symmetry axis angle calculation means 27 calculates the first angle which each first symmetry judgment segment forms with the first symmetry axis candidate, and further calculates the first angular difference of the first angle from 90°. The second symmetry axis angle calculation means 32 calculates the second angle which each second symmetry judgment segment forms with the second symmetry axis candidate, and further calculates the second angular difference of the second angle from 90°.

In the symmetry judgment means 205, the first symmetry judgment means 28 judges whether the input figure is symmetrical with respect to the first symmetry axis candidate based on the first distance differences and the first angular differences that have been calculated for the respective first symmetry judgment segments, and outputs the first judgment result to the orthogonal judgment means 23. Further, if the first symmetry axis candidate concerned is judged to provide line symmetry, the first symmetry judg-ment means 28 outputs the first symmetry axis candidate to the symmetry processing means 34. The second symmetry judgment means 33 judges whether the input figure is symmetrical with respect to the second symmetry axis candidate based on the second distance differences and the second angular differences that have been calculated for the respective second symmetry judgment segments, and then outputs the second judgment result to the orthogonal judgment means 23. Further, if the second symmetry axis candidate concerned is judged to provide line symmetry, the second symmetry judgment means 33 outputs the second symmetry axis candidate to the symmetry processing means 34.

When both the first and second symmetry axis candidates concerned are judged to provide line symmetry, the input figure is shaped into a figure that is completely line-symmetrical with respect to the orthogonal symmetry axis pair of the first and second symmetry axis candidates each having been judged to provide line symmetry.

Figure 5A:
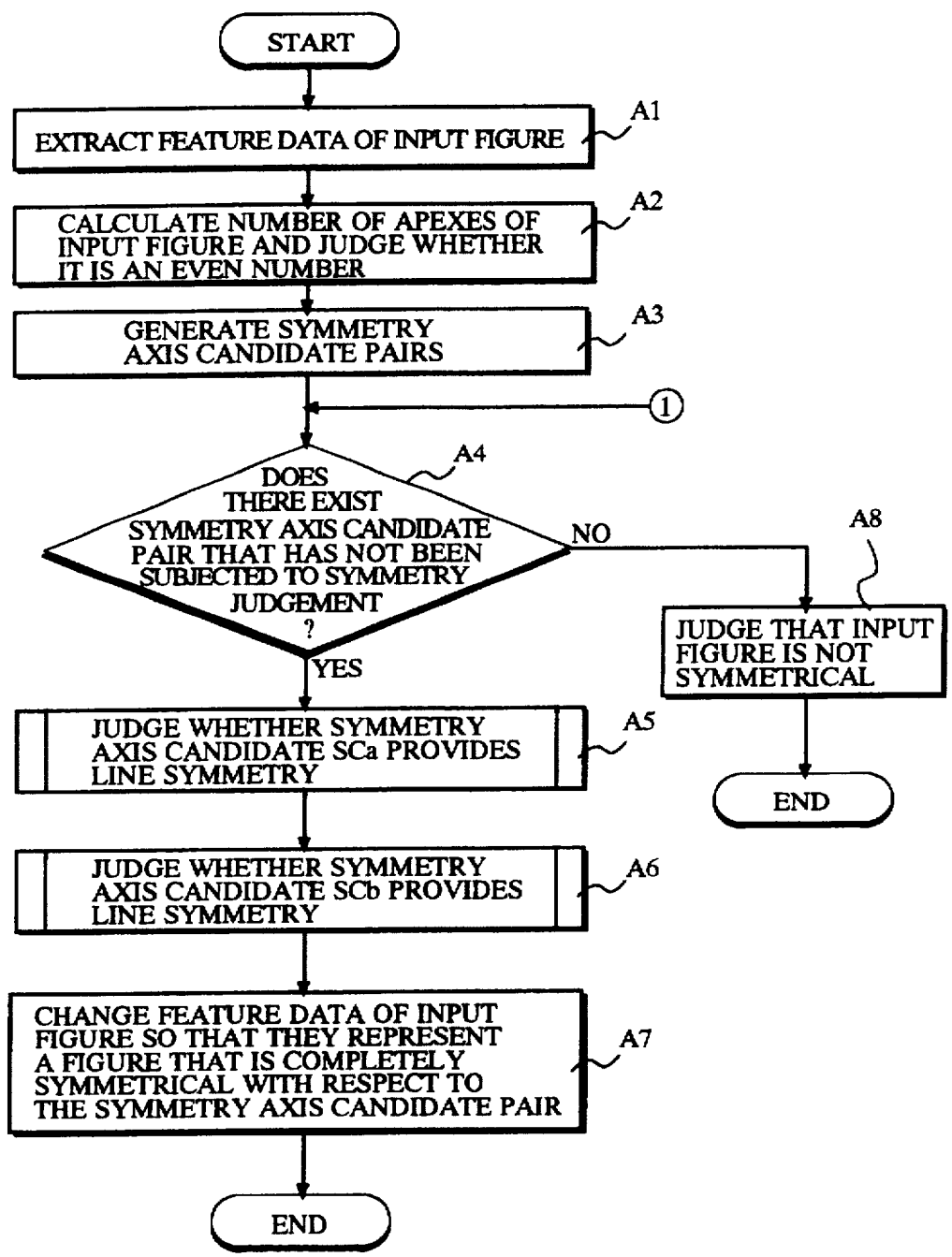
FIGS. 5A and 5B are a flowchart showing an example of a process executed by a data processing device used in the first embodiment of the present invention.
Figure 5B:
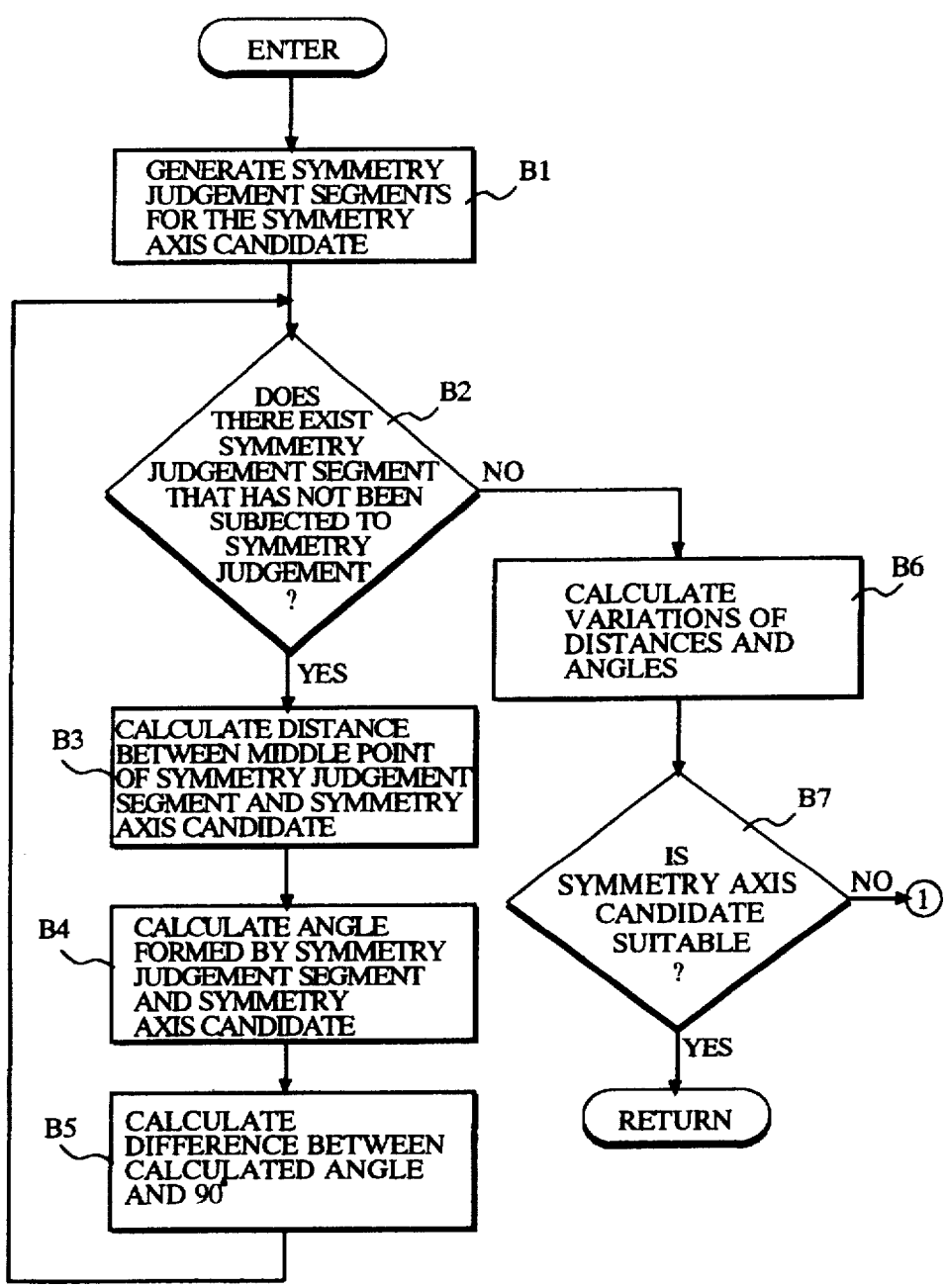

Referring to FIGS. 5A and 5B, as in the case of an ordinary figure recognition tool, feature data such as coordinates of apexes, angles formed by adjacent sides, lengths of sides, and kinds of lines (straight line or curve) are extracted from an input figure by the feature data extracting means 21 (step A1). The extracted feature data are stored in the memory 103 together with information of the input figure (e.g. triangle, rectangle, or polygon).

Next, the number-of-apexes calculation means 22 calculates the number of apexes of the input figure and judges whether it is an even number (step A2). If the number of apexes is an odd number, the input figure is judged to have no possibility that the figure is symmetrical with respect to orthogonal symmetry axes, so that the line-symmetrical shaping is not performed. In contrast, when the number of apexes is an even number, the input figure is judged to have a possibility that the figure is symmetrical with respect to orthogonal symmetry axes, so that the orthogonal symmetry axis candidate generation means 201 is started.

SYMMETRY AXIS CANDIDATE PAIRS GENERATION

Next, the orthogonal symmetry axis candidate generation means 201 generates all symmetry axis candidate pairs that will possibly become orthogonal symmetry axes based on the feature data stored in the memory 103 (step A3). More specifically, the first symmetry axis candidate generation means 24 generates the first symmetry axis candidates from each of apexes and middle points of sides that a symmetry axis may pass through while the feature data of the figure stored in the memory 103 are referred to. In other words, the first symmetry axis candidates are generated that consist of axes each of which connects a pair of apexes opposed to each other, connects a pair of middle points of sides opposed to each other, or connects a pair of an apex and the middle point of a side opposed to the apex. The first symmetry axis candidates generated like this are output one by one to the orthogonal judgment means 23 and the second symmetry axis candidate generation means 29. Receiving the first symmetry axis candidates one by one from the first symmetry axis candidate generation means 24, the second symmetry axis candidate generation means 29 generates second symmetry axis candidates which will probably become orthogonal to the respective first symmetry axis candidates based on the feature data stored in the memory 103, and then outputs the second symmetry axis candidates one by one to the orthogonal judgment means 23. The orthogonal judgment means 23 receives respective symmetry axis candidate pairs of the first and second symmetry axis candidates from the first symmetry axis candidate generation means 24 and the second symmetry axis candidate generation means 29, and then judges whether the first symmetry axis candidate and the second symmetry axis candidate are actually substantially orthogonal to each other. If they are, the orthogonal judgment means 23 generates a pair of the first symmetry axis candidate and the second symmetry axis candidate as a symmetry axis candidate pair. Such a process is repeated for all the first symmetry axis candidates generated by the first symmetry axis candidate generation means 24, so that all symmetry axis candidate pairs that will possibly become orthogonal symmetry axes are obtained.

Figure 6A:
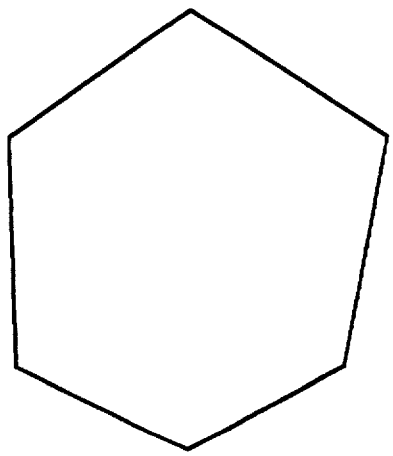
FIG. 6A shows an example of an input figure that is used to describe the operation of the first embodiment of the present invention.
Figure 6F:
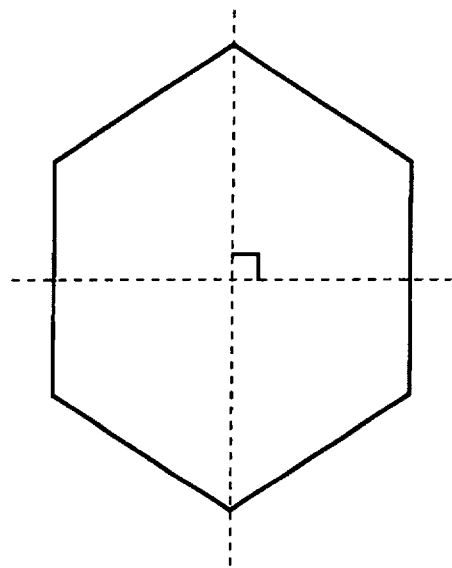
FIG. 6F shows a figure produced after the input figure is shaped for line-symmetrization.
Figure 6B:
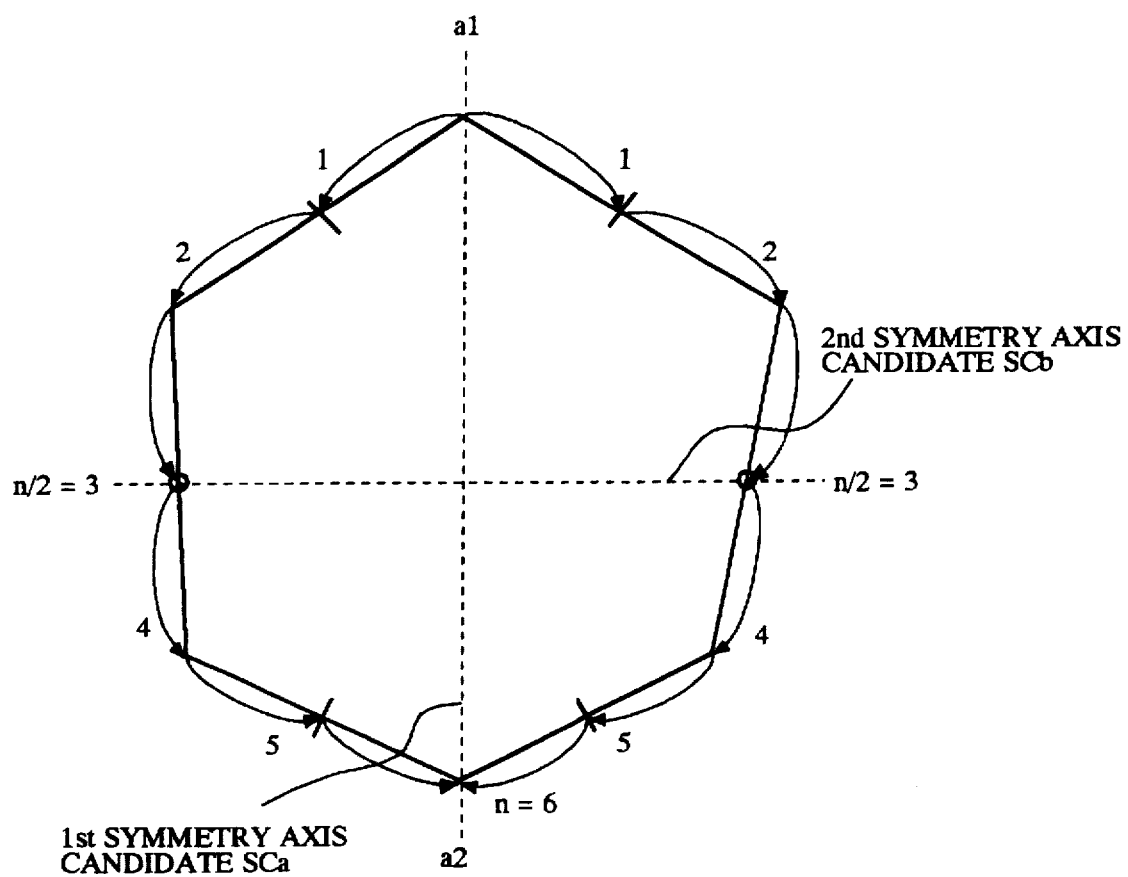
FIG. 6B shows an example of a symmetry axis candidate generating function.
Figure 6C:
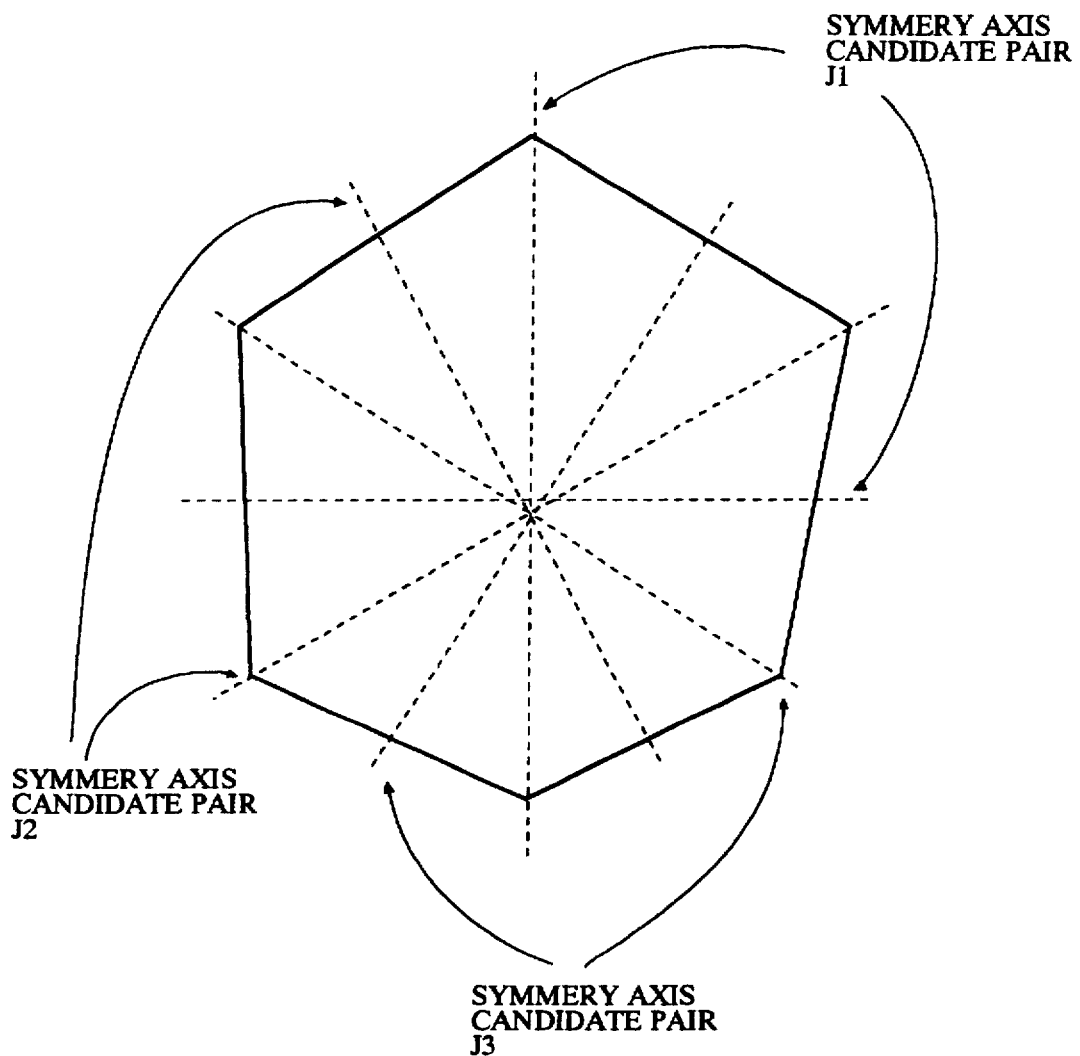
FIG. 6C shows an example of symmetry axis candidates generated by a symmetry axis candidate generating function.

For reference purposes, referring to FIG. 6B, it is assumed that the first symmetry axis candidate generation means 24 generates a symmetry axis candidate SCa passing through one apex a1 and the other apex a2. In this case, first, the second symmetry axis candidate generation means 29 traces apexes and middle points of respective sides that are located on both sides of the first symmetry axis candidate SCa in order starting from one apex a1 toward the other apex a2. If the other apex a2 is the n-th one, the n/2-th apexes are paired, and a line segment that passes through the n/2-th pair of apexes is employed as a second symmetry axis candidate. Subsequently, the orthogonal judgment means 23 judges whether the first symmetry axis candidate SCa and the second symmetry axis candidate are actually substantially orthogonal to each other. If the angle which the first symmetry axis candidate SCa forms with the second symmetry axis candidate falls within a predetermined range around 90°, the orthogonal judgment means 23 generates a symmetry axis candidate pair of the first symmetry axis candidate SCa and the second symmetry axis candidate Scb. Repeating such a process causes symmetry axis candidate pairs to be generated as shown in FIG. 6C. Hereinafter, of a symmetry axis candidate pair, the first symmetry axis candidate generated by the first symmetry axis candidate generation means 24 is referred to as a symmetry axis candidate "SCa" and the second symmetry axis candidate generated by the second symmetry axis candidate generation means 29 is referred to as a symmetry axis candidate "SCb".

After checking whether there exists symmetry axis candidate pair that has not been subjected to symmetry judgment, one symmetry axis candidate pair is selected from the symmetry axis candidate pairs that has not been subjected to symmetry judgment and is subjected to the symmetry axis judgment processing as described hereinafter.

SYMMETRY AXIS JUDGMENT

The symmetry axis judgment processing is composed of steps A5 and A6 (see FIG. 5A) which have the same control flow as shown in FIG. 5B.

The first step A5 for judging whether the symmetry axis candidate SCa provides line symmetry is performed as follows. Referring to FIG. 5B, apexes that are located on both sides of the first symmetry axis candidate SCa are traced in order from one apex (or middle point) to the other apex (or middle point) that the first symmetry axis candidate Sca passes through. The n-th apexes (n=1, 2, ... ) are paired, and a line segment that passes through the pair of apexes is employed as a symmetry judgment segment (step B1). The first symmetry axis distance calculation means 26 and the first symmetry axis angle calculation means 27 are performed by sequentially using the symmetry judgment segments thus generated.

In this embodiment, as described above, a line segment connecting a pair of apexes is employed as a symmetry judgment segment, because this is suitable for an input figure that is a polygonal figure consisting of straight line segments. However, the invention is not limited to the use of such symmetry judgment segments, but may use symmetry judgment segments that are generated in a different way, as exemplified below. The middle points of sides located on both sides of a selected symmetry axis candidate are determined in order from one apex (or middle point) to the other apex (or middle point) that the selected symmetry axis candidate passes through. The n-th middle points (n=1, 2, ...) are paired, and a line segment that connects the pair of middle points is employed as a symmetry judgment segment. In another example, a figure line of one side from one apex (or middle point) to the other apex (or middle point) that the selected symmetry axis candidate passes through is equally divided into a predetermined number of parts. A figure line of the other side are also equally divided into the same number of parts. A line segment connecting each pair of corresponding dividing points on the two figure lines is employed as a symmetry judgment segment. These two methods are suitable for the symmetry judgment of an input figure that includes a curved segment such as a circular arc.

By the first symmetry axis distance calculation means 26, the coordinates of the middle point of the symmetry judgment segment are calculated, and then the first distance difference between this middle point and the first symmetry axis candidate SCa is calculated (step B3). The angle formed by the symmetry judgment segment and the first symmetry axis candidate SCa is calculated by the symmetry axis angle calculation means 27 (step B4). Further, the first angular difference (absolute value) between the calculated angle and 90° is calculated (step B5).

If the steps B3–B5 have been executed for all the first symmetry judgment segments generated by the first symmetry judgment segment generation means 25 ("No" in step B2), respective variations of the first distance differences and the first angular differences are calculated by the first symmetry judgment means 28 (step B6). For example, the variations of the distances and the angular differences may be calculated by calculating averages or variances of the distances and angular differences. In cases where averages or variances are used, the symmetry is judged to be higher as they are close to zero. When the variations of the distances and the angular differences are smaller than given thresholds, the first symmetry judgment means 28 judges whether the input figure is symmetrical with respect to the first symmetry axis candidate SCa (step B7).

If the first symmetry judgment means 28 judges that the input figure is not line-symmetrical with respect to the first symmetry axis candidate Sca ("No" in step B7), the next first symmetry axis candidate pair is selected and steps A4 and B1–B7 are performed on the new first symmetry axis candidate.

If the first symmetry judgment means 28 judges that the input figure is line-symmetrical ("Yes" in step B7), the second step A6 for judging whether the second symmetry axis candidate SCb provides line symmetry is also performed as described in FIG. 5B. More specifically, the second symmetry judgment segment generation 30, the second symmetry axis distance calculation 31, the second symmetry axis angle calculation 32, and the second symmetry judgment means 33, perform the second step A6 (steps B1–B7) for the second symmetry axis candidate SCb similar to the step A5.

If the second symmetry judgment means 33 judges that the input figure is line-symmetrical ("Yes" in step 37 of step A6), the symmetrizing means 34 changes the feature data such as the coordinates of the apexes of the input figure which are stored in the memory 103 such that the feature data represent a figure that is completely symmetrical with respect to the symmetry axis candidate pair of the first and second symmetry axis candidates SCa and SCb (step A7). That is, the input figure is shaped into a line-symmetrical figure by symmetrically mapping the coordinates of the apexes on a predetermined quadrant of a plain defined by the first and second symmetry axis candidates SCa and SCb to the other quadrants of the same plain. After completion of the shaping, the output means 104 reproduces the figure based on the changed feature data, and displays it on a display device.

If the input figure is judged to be not line-symmetrical for all the symmetry axis candidate pairs ("No" in step A4), the input figure is finally judged to be not line-symmetrical (step A8) and the shaping is not performed.

A specific example of the first embodiment will be described to allow its clear understanding, in which the input figure is a hexagon shown in FIG. 6A.

It is assumed that a figure shown in FIG. 6A is input by a user through the input means 101. Feature data such as coordinates of apexes, lengths of sides, and kinds of the sides (straight line or curve) are extracted from the input figure, and stored in the memory 103 together with figure information (here hexagon). At this time, the input figure itself is displayed on the display device of the output means 104. Since the number of apexes of the input figure is an even number (6), the orthogonal symmetry axis candidate generation means 201 is started.

As described before, any symmetry axis candidate pair is generated as described in FIG. 6B, and three symmetry axis candidate pairs J1–J3 are generated as shown in FIG. 6C. Subsequently, the orthogonal judgment means 23 judges whether the respective symmetry axis candidate pairs J1–J3 are actually substantially orthogonal to each other. If the angle which the first symmetry axis candidate forms with the second symmetry axis candidate falls within a predetermined range around 90°, for instance, within 80°–100°, the orthogonal judgment means 23 generates a symmetry axis candidate pair of the first symmetry axis candidate SCa and the second symmetry axis candidate Scb. In this example, all the pairs J1–J3 are assumed to meet the orthogonal requirement.

Figure 6D:
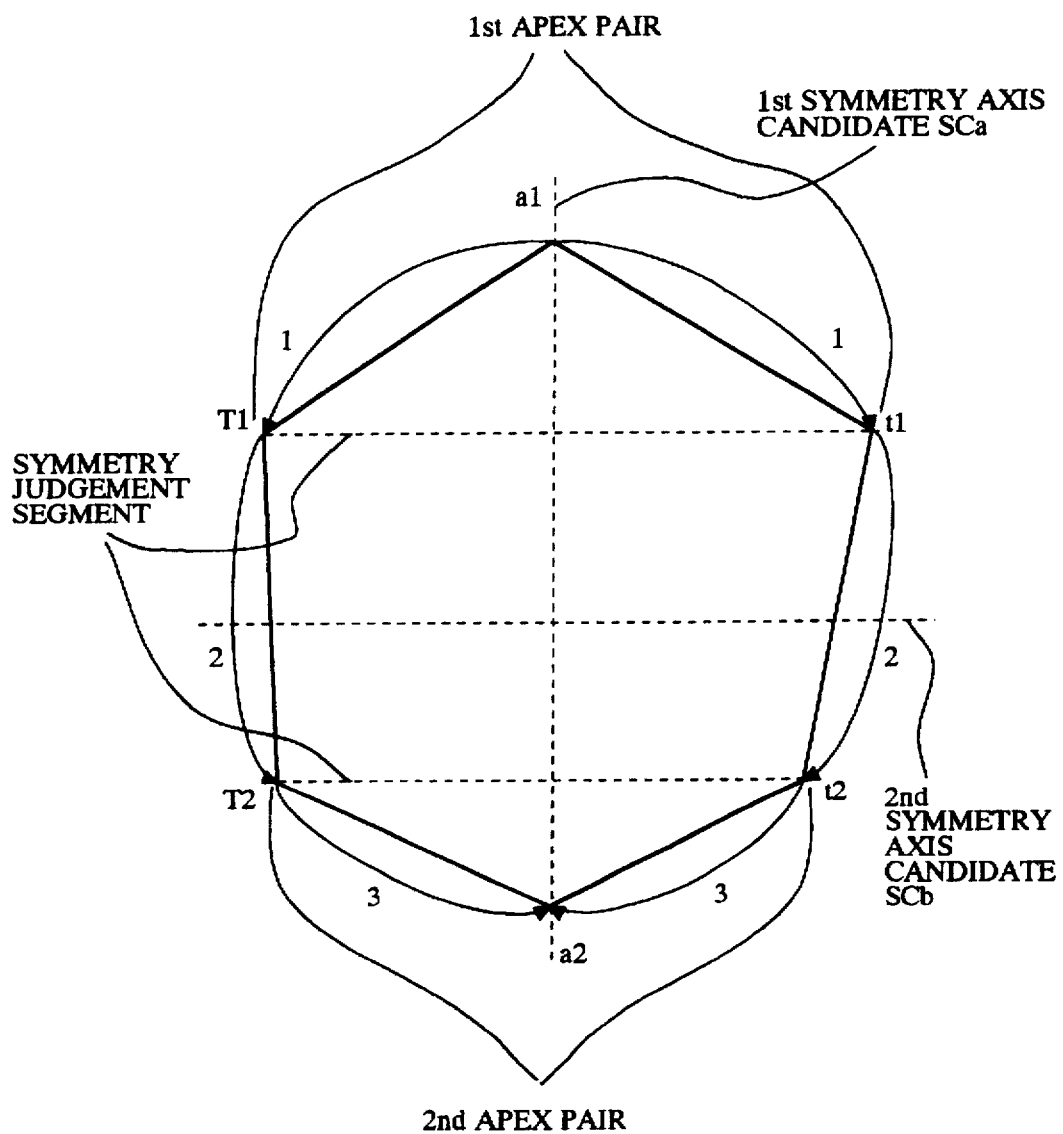
FIG. 6D shows an example of the operation of a symmetry judgment segment generation function.

First, the symmetry axis candidate pair J1 is selected for the symmetry judgment. As shown in FIG. 6D, the apexes on both sides of the first symmetry axis candidate SCa are traced in turn from the apex a1 to the other apex a2 of the opposed side that the first symmetry axis candidate SCa passes through. In the course of this operation, a symmetry judgment segment T1–t1 is generated by connecting the first pair of apexes with a straight line, and a symmetry judgment segment T2–t2 is generated by connecting the second pair of apexes with a straight line. In this example, two symmetry judgment segments are generated.

Figure 6E:
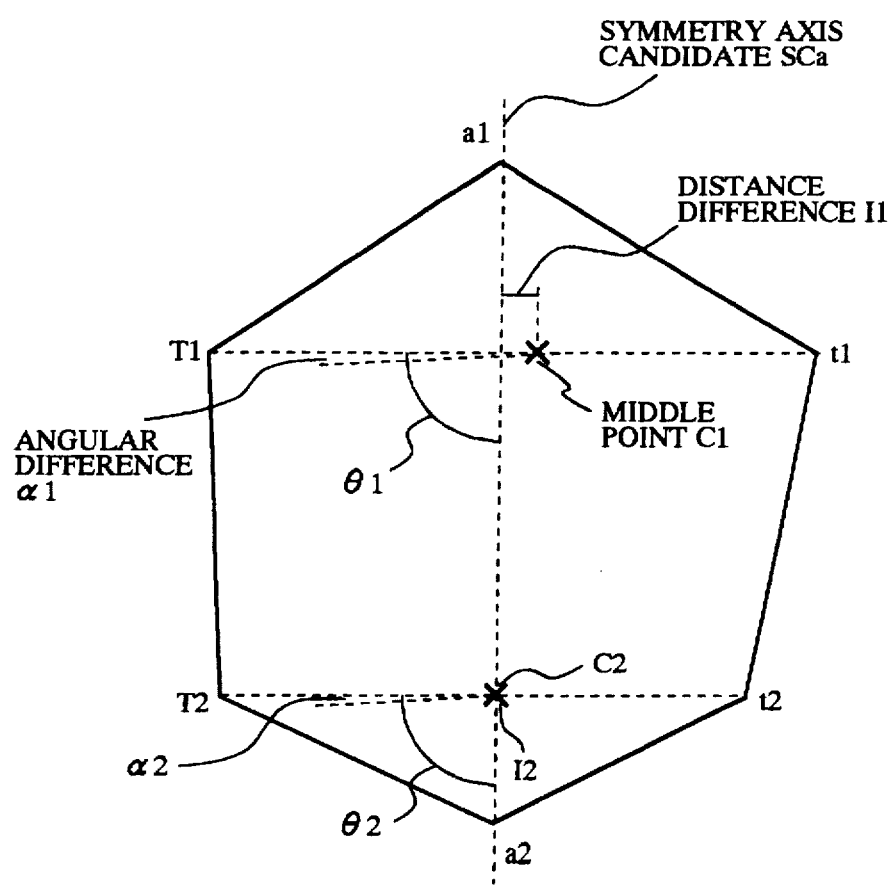
FIG. 6E shows a symmetry judgment segment, distances, and angles all of which are used in symmetry judgment.

Referring to FIG. 6E, with respect to the symmetry judgment segment T1–t1, coordinates of middle point C1 of the segment T1–t1 and its distance I1 from the first symmetry axis candidate SCa are calculated by the first symmetry axis calculation means 26. Angle θ 1 formed by the symmetry judgment segment T1–t1 and the first symmetry axis candidate SCa and its angular difference α 1 from 90° are calculated by the first symmetry axis angle calculation means 27. Similarly, coordinates of middle point C2 of the segment T2–t2 and its distance I2 from the first symmetry axis candidate SCa are calculated by the first symmetry axis calculation means 26. Angle θ 2 formed by the symmetry judgment segment T2–t2 and the first symmetry axis candidate SCa and its angular difference α 2 from 90° are calculated by the first symmetry axis angle calculation means 27.

Then, variations of distances I1 and I2 and angular differences α 1 and α 2 are calculated by the first symmetry judgment means 28. If it is assumed that I1=6, I2=0, α 1=5, and α 2=3, the average of I1 and I2 is 3 and the average of α 1 and α 2 is 4. if it is assumed that an input figure should be judged to be line-symmetrical with respect to the symmetry axis candidate concerned when the averages are smaller than a given value close to 0, for instance, 5, the input figure of FIG. 6A is judged to be line-symmetrical with respect to the first symmetry axis candidate SCa. Similarly, the second symmetry judgment means 33 performs the symmetry judgment for the second symmetry axis candidate SCb.

When the input figure of FIG. 6A is judged to be line-symmetrical with respect to both the first symmetry axis candidate SCa and the second symmetry axis candidate SCb, the feature data such as the coordinates of the apexes of the input figure are corrected by the symmetrizing means 34 so as to represent a figure that is completely line-symmetrical with respect to the symmetry axis candidate pair J1, and again stored into the memory 103. The figure thus generated is shaped as shown in FIG. 6F. In this example, using the coordinates of the apexes on the left upper (second) quadrant (including the point T1) of a plain defined by the symmetry axis candidate pair J1 as a reference, coordinates of the apexes on the other quadrants are corrected. After completion of the shaping, the output means 104 displays on the display device the figure of FIG. 6F in place of the figure of FIG. 6A.

According to the first embodiment, a symmetry axis candidate pair is automatically extracted from a figure that is manually input by a user, and the input figure can be shaped into a figure that is line-symmetrical with respect to a symmetry axis candidate pair.

Second Embodiment

Figure 7:
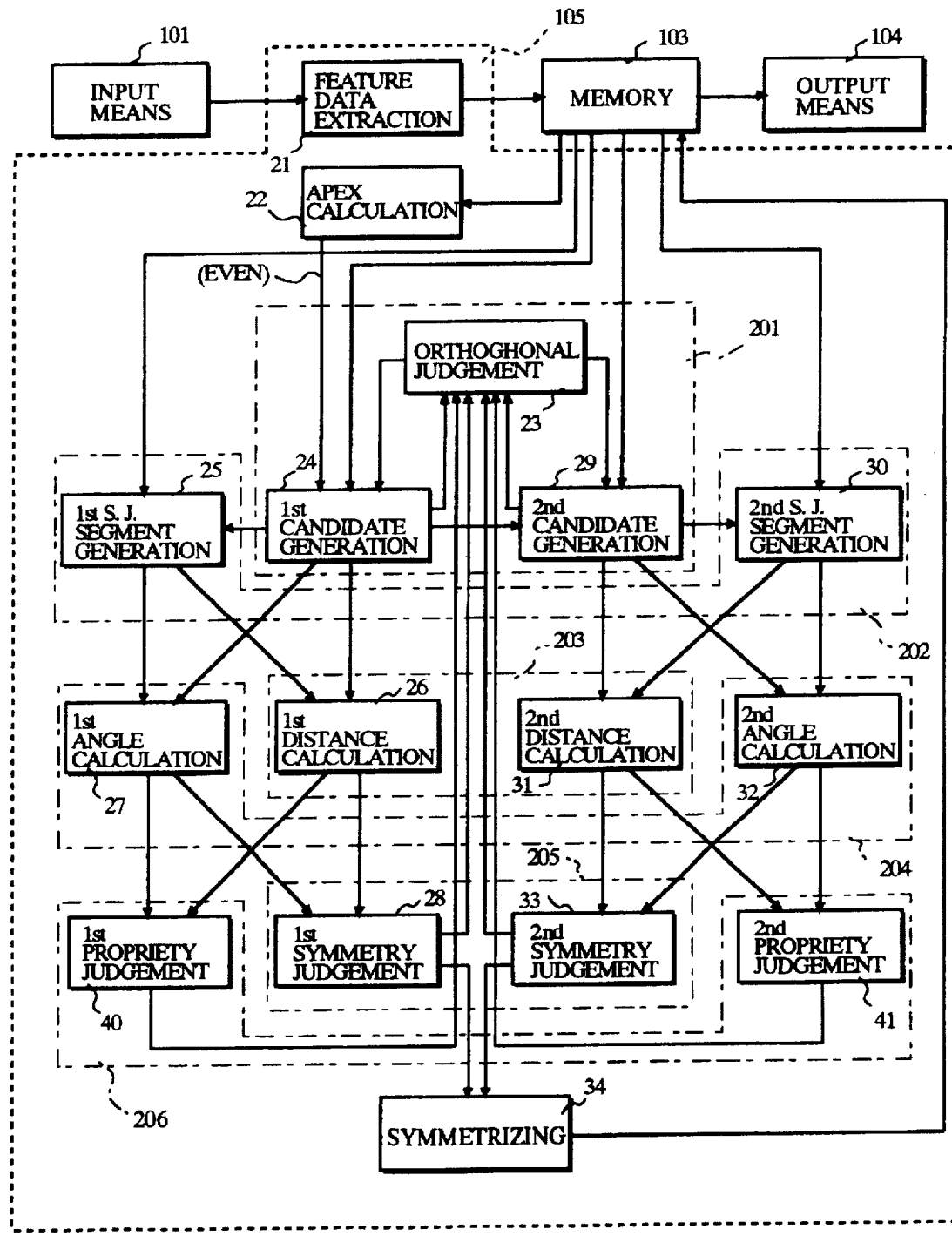
FIG. 7 is a functional block diagram showing a line-symmetrical figure shaping system according to a second embodiment of the present invention.

Referring to FIG. 7, in a second embodiment of the invention, a data processing device 105 is provided with an apex pair propriety judgment means 206 consisting of a first apex pair propriety judgment means 40 and a second apex pair propriety judgment means 41. Every time distance and angular differences are calculated for each symmetry judgment segment, the first apex pair propriety judgment 40 compares those calculated values with predetermined thresholds. Thus, the first apex pair propriety judgment 40 judges the symmetry with respect to the first symmetry axis candidate SCa for the symmetry judgment segment concerned. If the judgment is "unsymmetrical" the first apex pair propriety judgment means 40 stops the processing on the symmetry axis candidate pair concerned and notifies the orthogonal judgment means 23 in order to start processing on the next symmetry axis candidate pair. Similarly, every time distance and angular differences are calculated for each symmetry judgment segment, the second apex pair propriety judgment 41 compares those calculated values with predetermined thresholds. Thus, the second apex pair propriety judgment 41 judges the symmetry with respect to the second symmetry axis candidate SCb for the symmetry judgment segment concerned. If the judgment is "unsymmetrical," the second apex pair propriety judgment means 41 stops the processing on the symmetry axis candidate pair concerned and notifies the orthogonal judgment means 23 in order to start processing on the next symmetry axis candidate pair. Since the other function means 21, 22, 34 and 201–205 are the same as those in the first embodiment shown in FIG. 4, detailed descriptions therefor are omitted.

Figure 8:
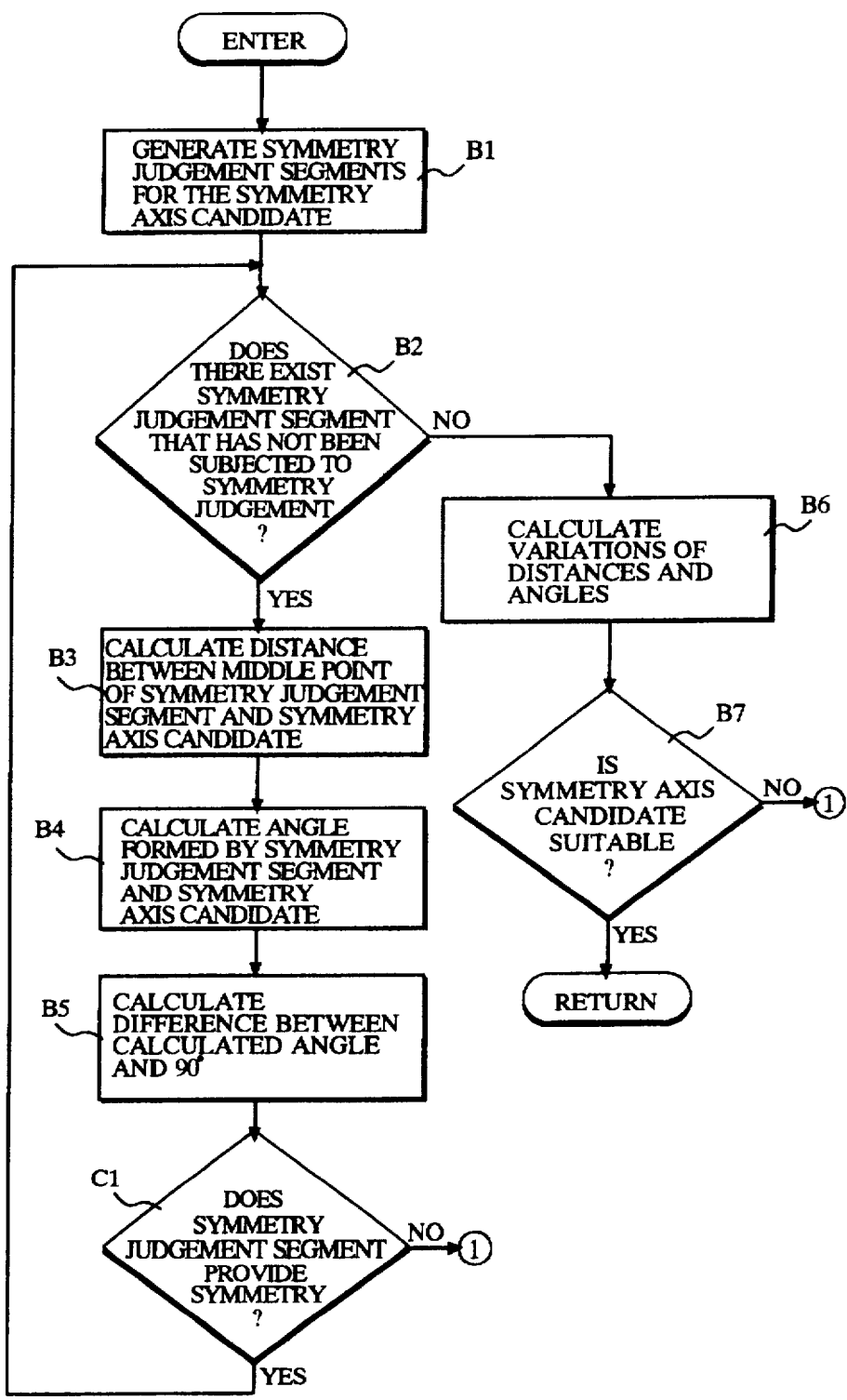
FIG. 8 is a flowchart showing an example of a process executed by a data processing device used in the second embodiment of the present invention.

Referring to FIG. 8, steps B1–B7 are the same as those in the first embodiment shown in FIG. 5B. In the first embodiment, the propriety of one symmetry axis candidate is judged after the distances and the angular differences for all the symmetry judgment segments and the symmetry axis candidate concerned. In contrast, in the second embodiment, every time a distance and an angular difference are calculated for one symmetry judgment segment, it is judged whether the calculated distance and angular difference are smaller than respective given thresholds (step C1). It they are smaller than the given thresholds, the calculation of a distance and an angular difference is continued for the remaining symmetry judgment segments with a judgment that it is highly probable that the current symmetry judgment segment is symmetrical with the symmetry axis candidate concerned ("Yes" in step C1). On the other hand, if at least one of the distance and the angular difference exceeds the given threshold, the input figure is judged to be unsymmetrical with respect to the symmetry axis candidate pair concerned ("No" in step C1). In this case, the processing on the symmetry axis candidate concerned is stopped to start processing on the new symmetry axis candidate pair.

The second embodiment can provide faster processing speed than the first embodiment, because it can discard a symmetry axis candidate pair that does not provide symmetry at an early stage.

Third Embodiment

Figure 9:
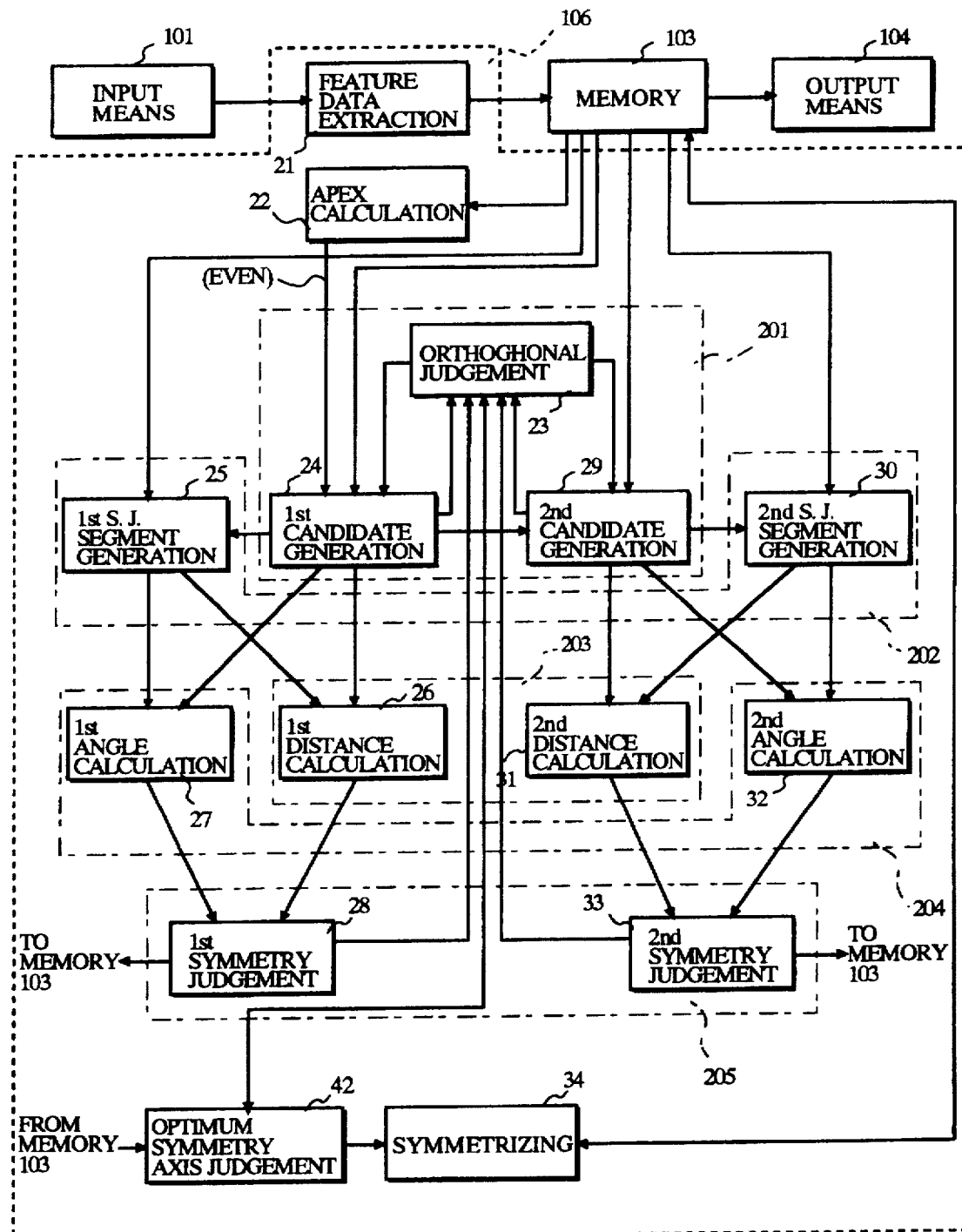
FIG. 9 is a functional block diagram showing a line-symmetrical figure shaping system according to a third embodiment of the present invention.

Referring to FIG. 9, in a third embodiment of the invention, a data processing device 106 is provided with an optimum symmetry axis judgment means 42. Although the symmetry judgment means 205 is performed on every symmetry axis candidate pair, it is not a final one. At a time point when the symmetry judgment means 205 has been performed on all the symmetry axis candidate pairs, the optimum symmetry axis judgment means 42 selects, among the symmetry axis candidate pairs that have been judged to provide symmetry, one symmetry axis candidate pair that provides the highest degree of symmetry. The symmetrizing means 34 symmetrizes the input figure by using the most appropriate symmetry axis pair thus selected. Since the other functions 21, 22, 34 and 201-205 are the same as those of the first embodiment shown in FIG. 4, descriptions therefor are omitted.

Figure 10A:
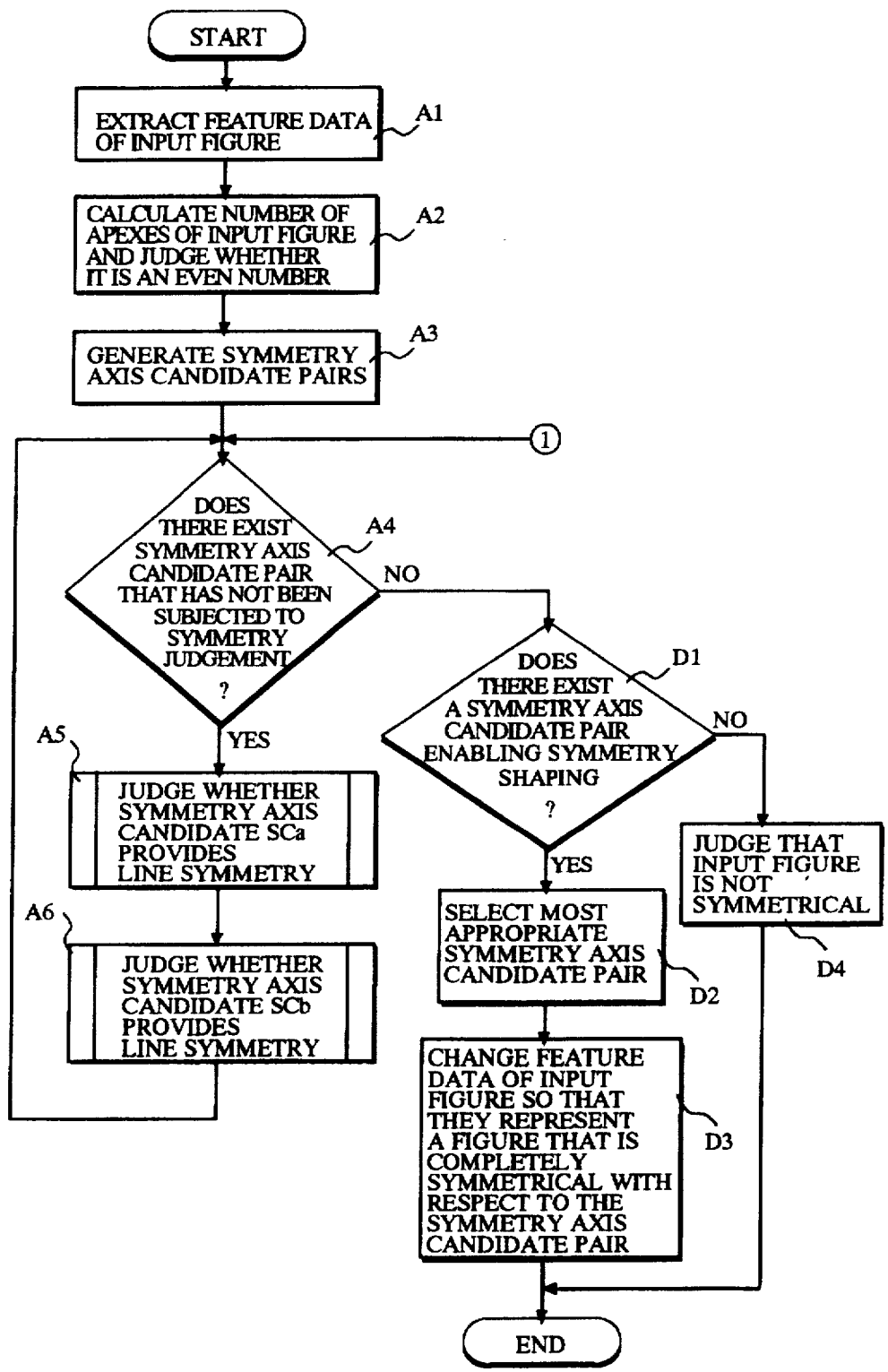
FIGS. 10A and 10B are a flowchart showing an example of a process executed by a data processing device used in the third embodiment of the present invention.
Figure 10B:
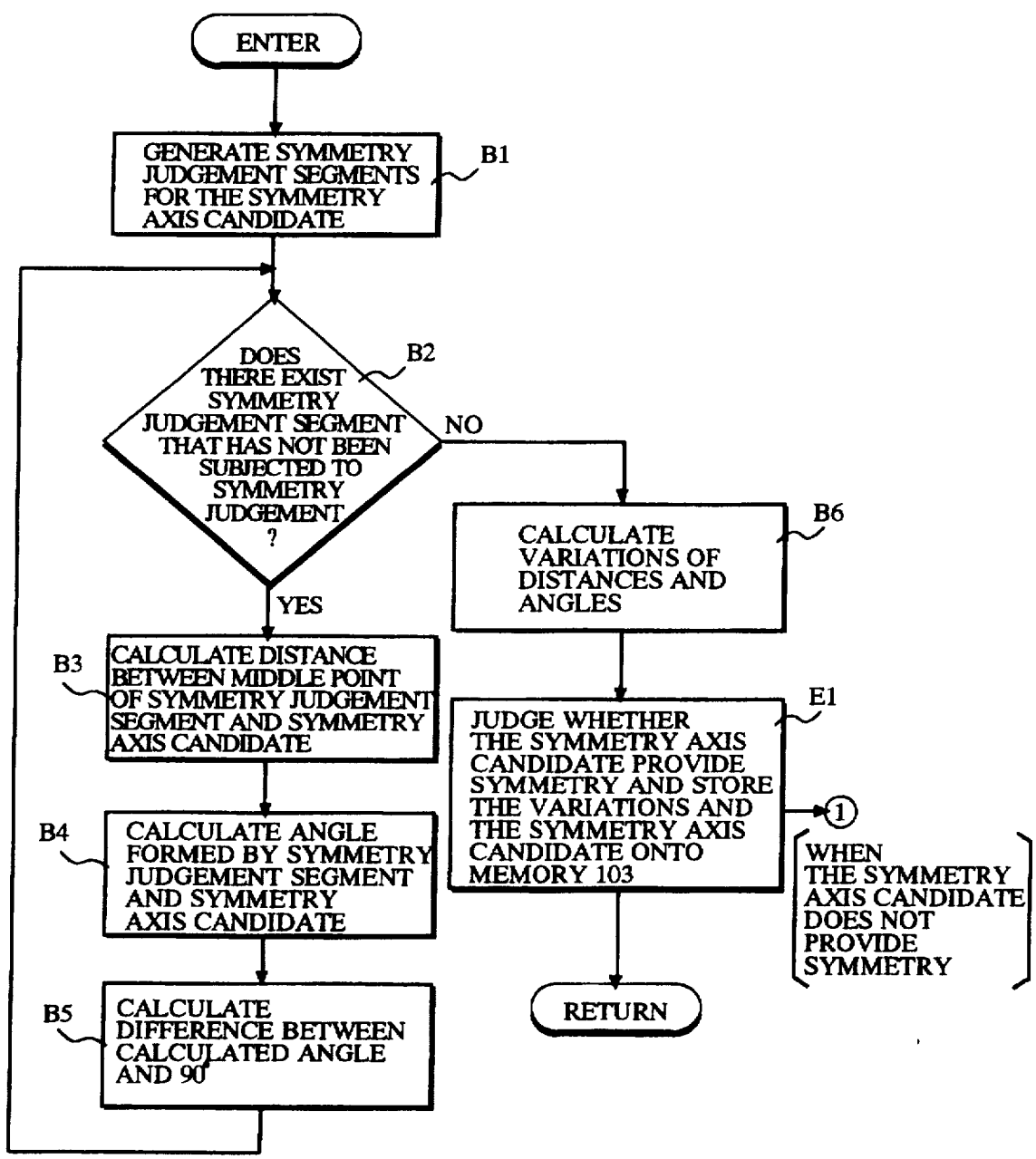

Referring to FIGS. 10A and 10B, while steps A1-A6 and B1-B6 are the same as those in the first embodiment shown in FIGS. 5A and 5B, steps D1-D4 and E1 are newly provided in this embodiment. The operation of the third embodiment will be described with reference to FIGS. 10A and 10B. However, detailed descriptions of steps A1-A6 and B1-B6 will be omitted.

As described before, in the first embodiment, distances and angular differences are calculated between each symmetry axis candidate and respective symmetry judgment segments. If variations of the calculated distances and angular differences for each symmetry axis candidate are within the given thresholds, the line-symmetry shaping is immediately performed by using the symmetry axis candidate pair concerned.

In step A5 of the third embodiment as shown in FIG. 10A, if the first symmetry judgment means 28 judges that the first symmetry axis candidate SCa provides symmetry, the variations in distance and angular difference that have been calculated for the first symmetry axis candidate SCa are stored into the memory 103. The first symmetry axis candidate SCa is also stored as a symmetry axis candidate enabling symmetry shaping (step E1 of FIG. 10B). Similarly, in step A6 as shown in FIG. 10A, if the second symmetry judgment means 33 judges that the second symmetry axis candidate SCb provides symmetry, the variations in distance and angular difference that have been calculated for the second symmetry axis candidate SCb are stored into the memory 103. The second symmetry axis candidate SCb is also stored as a symmetry axis candidate enabling symmetry shaping (step E1 of FIG. 10B).

After the symmetry judgment has been performed for all the symmetry axis candidate pairs ("No" in step A4), the optimum symmetry axis judgment means 42 checks whether a symmetry axis candidate pair enabling symmetry shaping is stored in the memory 103 (step D1). If there exists at least one symmetry axis candidate pair enabling symmetry shaping, a symmetry axis candidate pair providing the highest degree of symmetry is selected based on the variations in distance and angular differences (step D2). The symmetrizing means 34 alters the feature data of the input figure so that they represent a figure that is completely line-symmetrical with respect to the selected symmetry axis candidate pair (step D3). If there exists no symmetry axis candidate pair enabling symmetry shaping ("No" in step D1), the input figure is judged to be unsymmetrical (step D4).

The third embodiment can produce a line-symmetrical figure that is closest to the input figure, because it can shape the input figure in connection with the symmetry axis pair providing the highest degree of symmetry.

Fourth Embodiment

Figure 11:
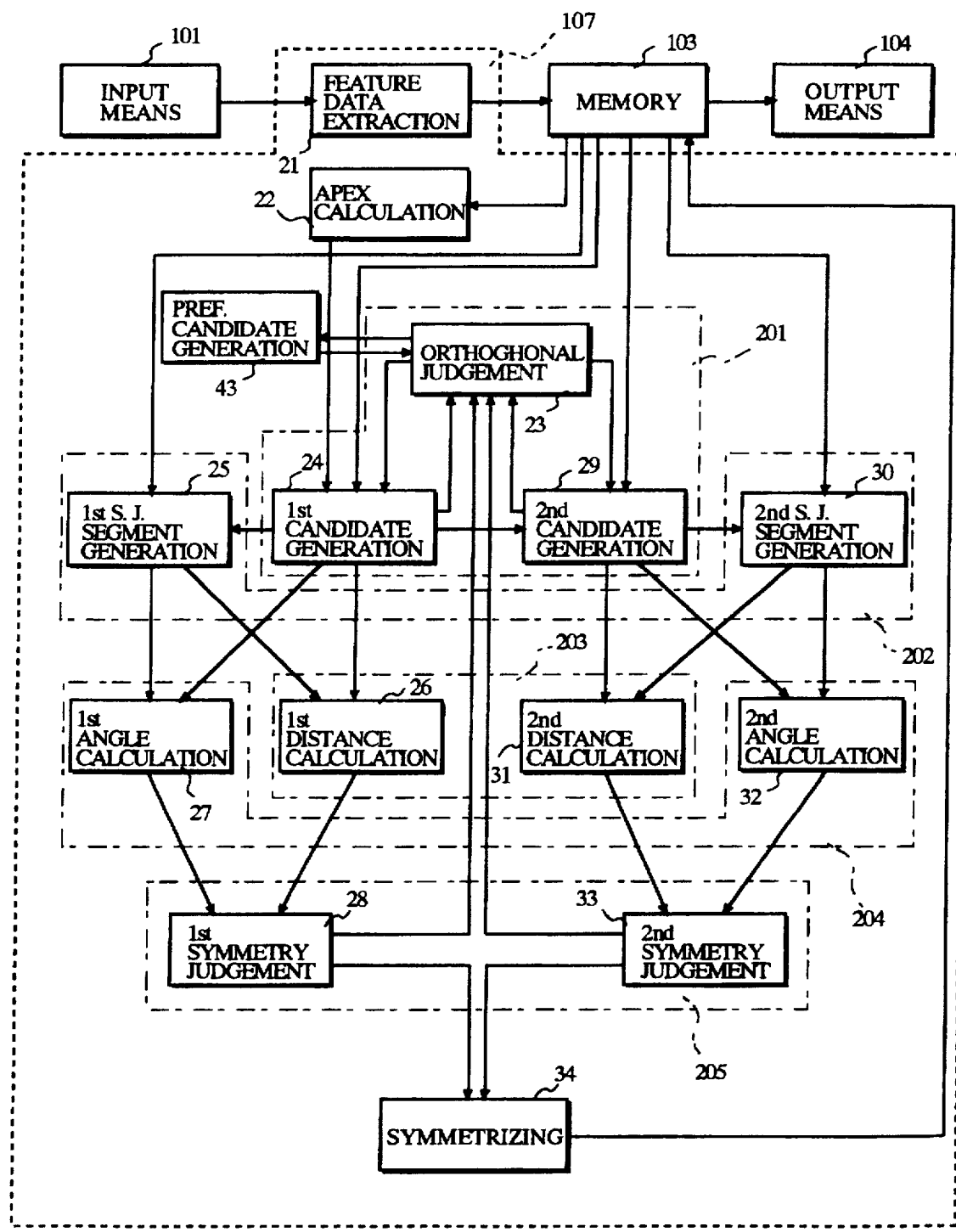
FIG. 11 is a functional block diagram showing a line-symmetrical figure shaping system according to a fourth embodiment of the present invention.

Referring to FIG. 11, in a fourth embodiment of the invention, a data processing device 107 is provided with a preferential axis candidate generation means 43. The preferential axis candidate generation means 43 judges whether symmetry axis candidate pairs include a symmetry axis candidate pair that appears horizontal and vertical in a displayed picture of an input figure. If it is judged that there exists such a symmetry axis candidate pair, the processing order of the symmetry axis candidates is determined so that the symmetry axis candidate pair consisting of the horizontal and vertical symmetry axis candidates is processed with preference. Since the other function means 21, 22, 34 and 201-205 are the same as those of the first embodiment shown in FIG. 4, descriptions therefor are omitted.

Figure 12:
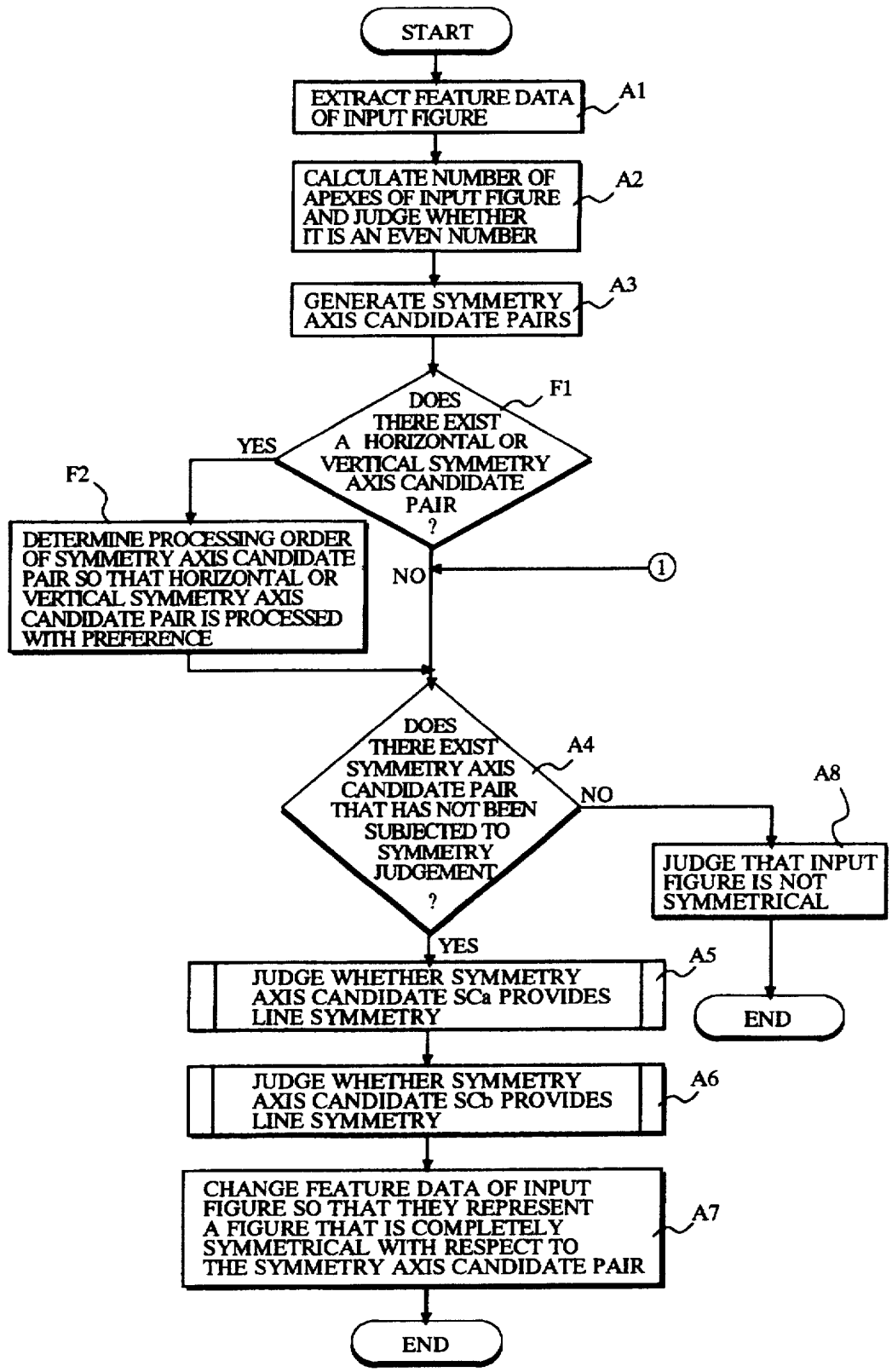
FIG. 12 is a flowchart showing an example of a process executed by a data processing device used in the fourth embodiment of the present invention.

In FIG. 12, while steps A1-A8 are the same as those of the first embodiment shown in FIG. 5A, steps F1 and F2 are newly added in the fourth embodiment. The operation of this embodiment will be described with reference to FIG. 12. However, detailed descriptions of steps A1-A8 will be omitted.

Referring to FIG. 12, when all the symmetry axis candidate pairs have been generated (step A3), the preferential axis candidate generation means 43 judges whether the symmetry axis candidate pairs include a symmetry axis candidate pair consisting of a first and second symmetry axis candidates that appear horizontal and vertical in a displayed picture of the input figure, respectively (step F1). If there exists such a symmetry axis candidate pair ("YES" in stop F1), the processing order of the symmetry axis candidate pairs is determined so that the symmetry axis candidate pair of the horizontal and vertical symmetry axis candidates is processed with preference (step F2). As a result, step A4 and the following steps are performed with preference given to the symmetry axis candidate pair of the horizontal and vertical symmetry axis candidates.

The fourth embodiment can easily produce a line-symmetrical figure having horizontal and vertical symmetry axes by processing, with preference, a symmetry axis candidate pair in which a first symmetry axis candidate and a second symmetry axis candidate extend in the vertical and horizontal directions on the display screen, respectively. In general, in inputting a line-symmetrical figure by hand writing, a user tends to set a symmetry axis in the horizontal or vertical direction. Therefore, this embodiment can efficiently detect such a symmetry axis pair and shape the input figure into a figure as desired by the user.

Fifth Embodiment

Figure 13:
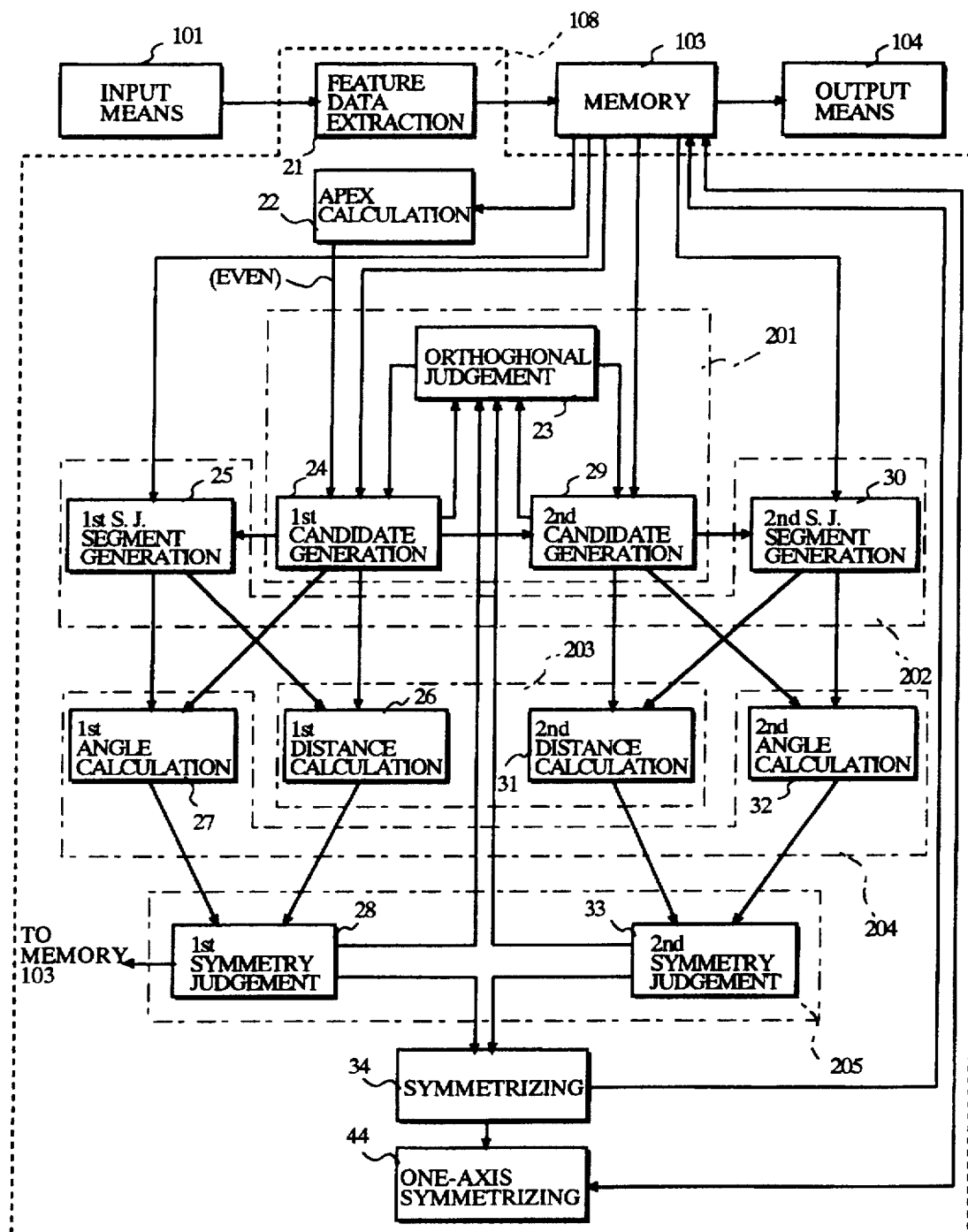
FIG. 13 is a functional block diagram showing a line-symmetrical figure shaping system according to a fifth embodiment of the present invention.

Referring to FIG. 13, a fifth embodiment of the invention is different from the first embodiment shown in FIG. 4 in additionally having an one-axis symmetrizing means 44 and the first symmetry judgment means 28. More specifically, when judging that a first symmetry axis candidate SCa provides symmetry, the first symmetry judgment means 28 informs the symmetrizing means 34 of the first symmetry axis candidate SCa and its symmetry information including calculated variations of distance and angular differences. The first symmetry axis candidate SCa and its symmetry information are also stored in the memory 103. If the input figure is not symmetrical with respect to the symmetry axis candidate pair but only the first symmetry axis candidate, The one-axis symmetrizing means 44 shapes the input figure into a figure that is symmetrical with respect to the first symmetry axis candidate.

Figure 14:
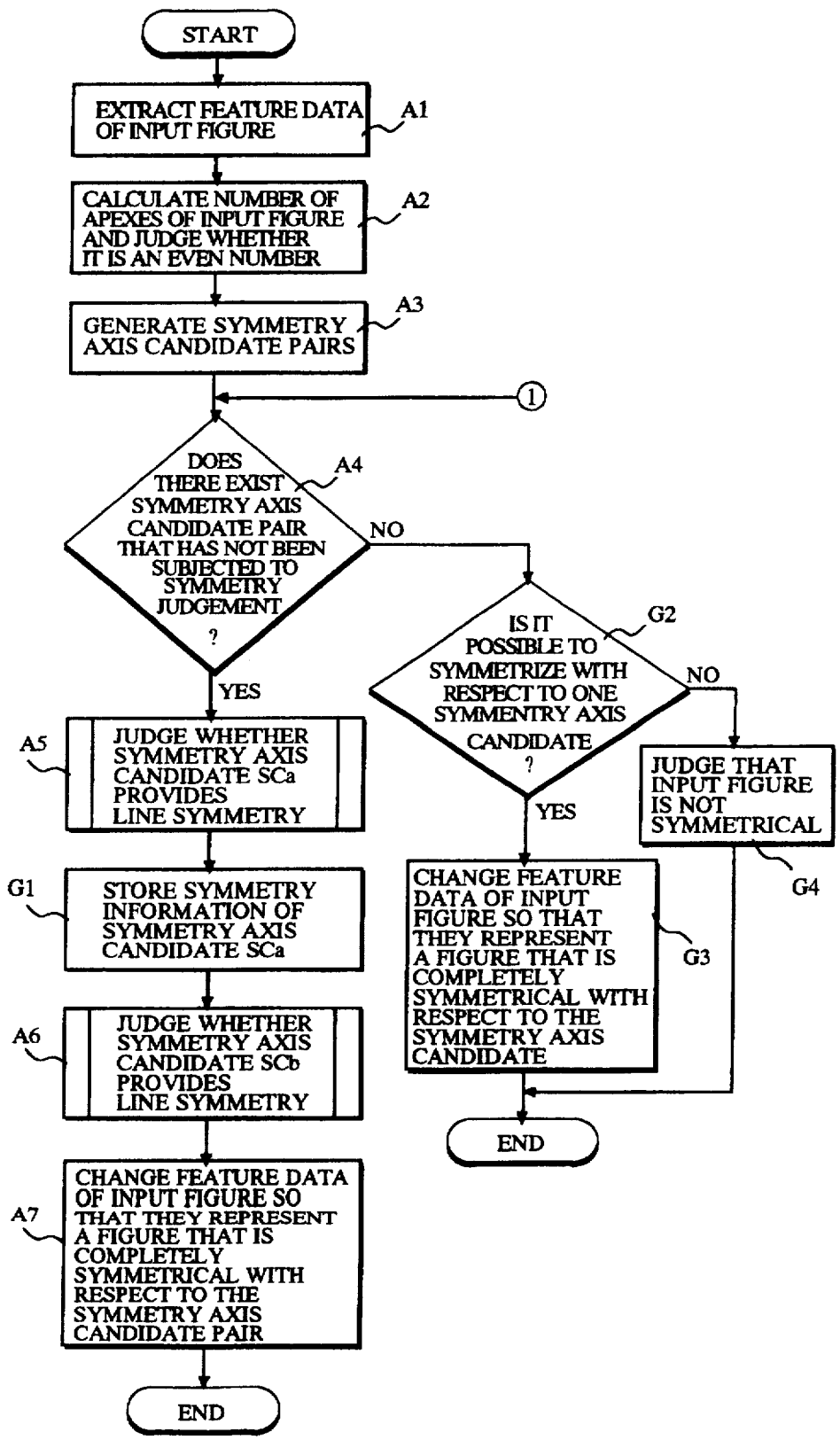
FIG. 14 is a flowchart showing an example of a process executed by a data processing device used in the fifth embodiment of the present invention.

In FIG. 14, while steps A1–A7 are the same as those in the first embodiment shown in FIG. 5A, the fifth embodiment is different from the first embodiment in having steps G1–G4. The operation of this embodiment will be described with reference to FIG. 14.

Referring to FIG. 14, the first symmetry judgment means 28 judges that a first symmetry axis candidate SCa provides symmetry (step A5), and stores the first symmetry axis candidate SCa and its symmetry information onto the memory 103 (step G1).

If the input figure is not symmetrical for all the symmetry axis candidate pairs ("No" in step A4), the symmetrizing means 34 informs the one-axis symmetrizing means 44 for performing the following steps G2–G4. Referring to the memory 103, the one-axis symmetrizing means 44 judges whether the input figure is symmetrical with respect to a certain symmetry axis candidate for shaping (step G2). If symmetrizing is possible with respect to the symmetry axis candidate ("YES" in step G2), the one-axis symmetrizing means 44 alters the feature data of the input figure so that they represent a figure that is completely line-symmetrical with respect to the most appropriate symmetry axis candidate (step G3). If there exists no symmetry axis candidate enabling symmetry shaping ("No" in step G2), the input figure is judged to be unsymmetrical (step G4).

The fifth embodiment can shape an input figure into a line-symmetrical figure with respect to one symmetry axis candidate even whether the input figure is not symmetrical with respect to a symmetry axis candidate pair, resulting in increased number of figures that can be shaped into a line-symmetrical figure.

Sixth Embodiment

Figure 15:
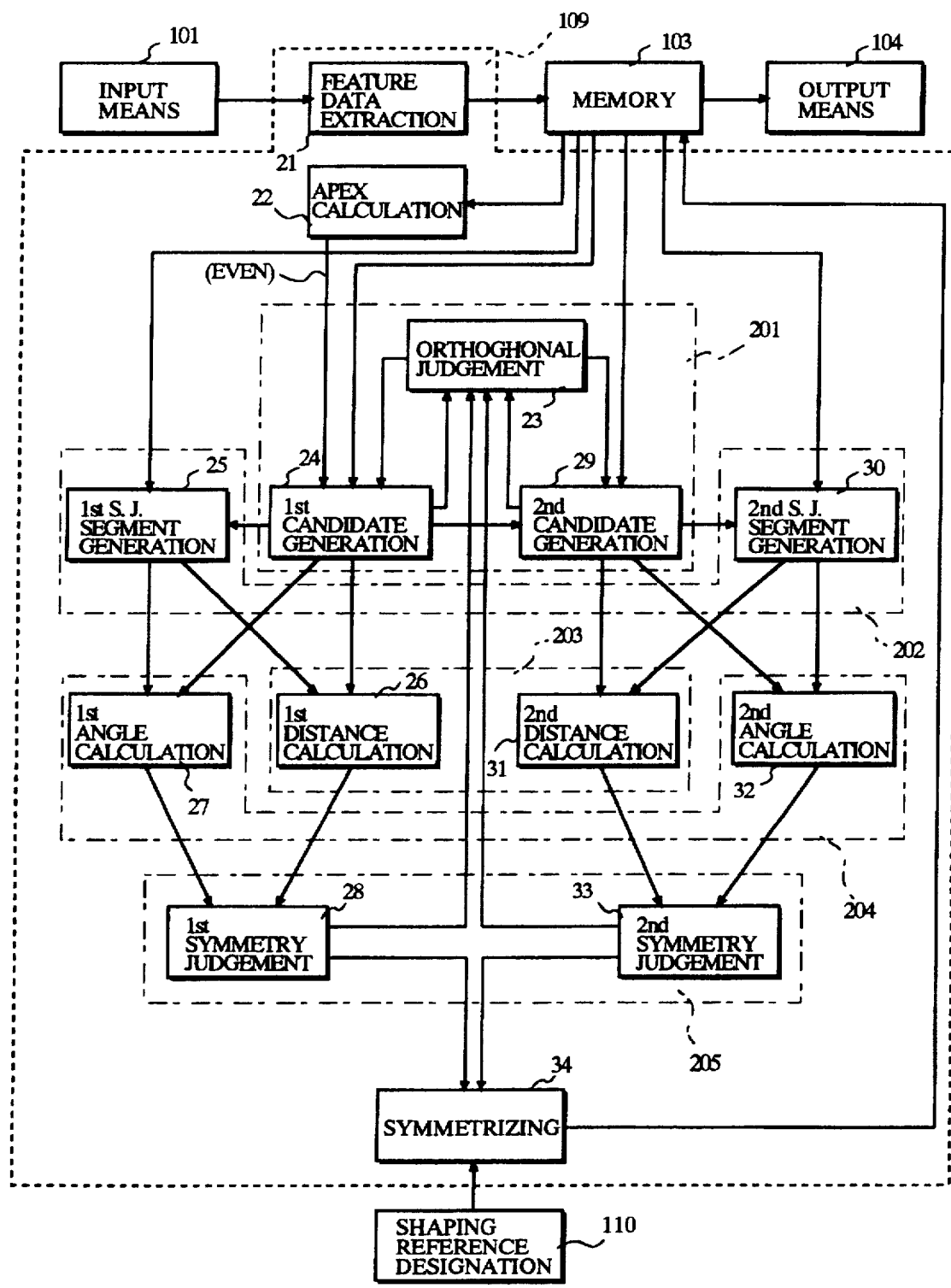
FIG. 15 is a functional block diagram showing a line-symmetrical figure shaping system according to a sixth embodiment of the present invention.

Referring to FIG. 15, a sixth embodiment of the invention is different from the first embodiment shown in FIG. 4 in additionally having a shaping reference designation means 110. When the symmetrizing means 34 shapes an input figure using a symmetry axis obtained by the symmetry judgment means 205, the shaping reference designation means 110 receives a reference element for shaping from a user and informs the symmetrizing means 34 of the received element.

Figure 16:
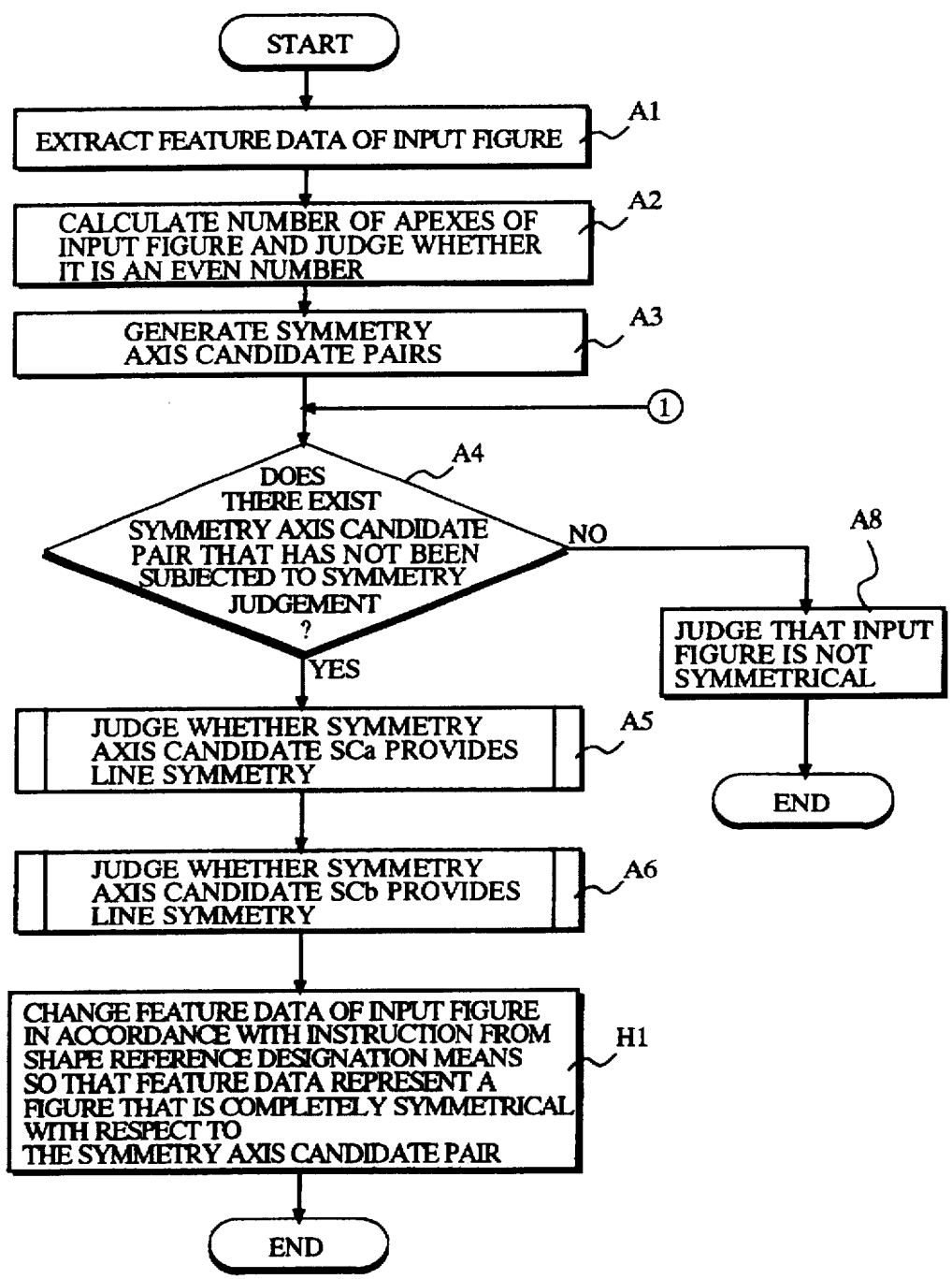
FIG. 16 is a flowchart showing an example of a process executed by a data processing device used in the sixth embodiment of the present invention.

In FIG. 16, while steps A1–A6 and A8 are the same as those in the first embodiment shown in FIG. 5A, the sixth embodiment is different from the first embodiment in having step H1. The operation of this embodiment will be described with reference to FIG. 16.

Referring to FIG. 16, upon reception of a symmetry axis candidate pair enabling symmetry shaping from the symmetry judgment means 205, the symmetrizing means 34 requests the shape reference designation means 110 to inform a reference element for shaping. According to the above request, the shape reference designation means 110 receives an instruction of a shape reference element from a user and informs the symmetrizing means 34 of the received instruction. A shaping reference element may be designated in the following manner. For example, while the symmetry axis candidate pair concerned is temporarily displayed on the display device so as to be superimposed on the input figure, a user is requested to specify, through a keyboard or with a mouse or the like, which quadrant of a plain defined by the two symmetry axis candidates should be used as a reference. The symmetrizing means 34 shapes the input figure in accordance with the instruction received from the shape reference designation means 110 (Step H3).

The fifth embodiment can shape an input figure into a line-symmetrical figure that more conforms to a user's intention, because it allows designation of a reference for shaping of the symmetrizing.

While the invention has been described above by way of several embodiments, the invention is not limited to those embodiments but various additions and modifications are possible as exemplified below.

A system may be constructed by adding, to the first embodiment (FIG. 4), an arbitrary combination of the apex pair propriety judgment means 206 (FIG. 7), the preferential axis candidate generation means 43 (FIG. 11), the one axis symmetrizing means 44 (FIG. 13), and the shape reference designation means 110 (FIG. 15).

Further, a system may be constructed by adding, to the third embodiment (FIG. 9), an arbitrary combination of the apex pair propriety judgment means 206 (FIG. 7), the preferential axis candidate generation means 43 (FIG. 11), the one axis symmetrizing means 44 (FIG. 13), and the shape reference designation means 110 (FIG. 15). In the case of adding the preferential axis candidate generation means 43, the optimum symmetry axis judgment means 42 is adapted to select a symmetry axis candidate providing the highest degree of symmetry from symmetry axis candidates, if any, that appear horizontal or vertical on the display screen, or from all available symmetrical axis candidates if there is no horizontal or vertical symmetrical axis candidate.

In the above embodiments, the symmetry axis distance calculation means 203 consists of a first and second symmetry axis distance calculation means 26 and 31. However, it is apparent that the first and second symmetry axis distance calculation means 26 and 31 may be integrated into one distance calculation means. Similarly, it is also apparent that the first and second symmetry axis angle calculation means 27 and 32 may be integrated into one angle calculation means and the first and second symmetry judgment means 28 and 33 into one symmetry judgment means.

The above-described line-symmetrical figure shaping systems according to the invention can provide the following advantages.

In the invention, all the symmetry axis candidate pairs each of which will possibly become orthogonal symmetry axes of an input figure are generated from feature data such as coordinates of apexes of the input figure, a single symmetry axis candidate pair to become actual orthogonal symmetry axes is determined from those candidate pairs, and the input figure is shaped into a completely symmetrical figure by using the symmetry axis pair thus determined. Therefore, an arbitrary figure that has been drawn by a user without considering its symmetry axis can be automatically shaped into a figure that is line-symmetrical with respect to the respective orthogonal symmetry axes of the determined symmetry axis pair.

If the shaping is performed by using as a symmetry axis pair, a symmetry axis candidate pair that is first judged to provide line symmetry, fast processing can be realized. Further, if a symmetry axis candidate pair that appears horizontal and vertical on the display screen is processed with preference, a figure that is line-symmetrical with respect to that symmetry axis candidate pair can be generated efficiently with preference given thereto.

In cases where the shaping is performed by selecting the most suitable symmetry axis candidate pair as a symmetry axis pair, a line-symmetrical figure that is closest to an input figure can be obtained. If the preferential axis candidate judgment means is added to this configuration, a figure that is line-symmetrical with respect to a symmetry axis candidate pair, if any, that appears horizontal and vertical on the display screen can be generated with preference.

The configuration having the apex pair propriety judgment means enables faster processing, because it can discard symmetry axis candidate pairs not providing symmetry at an early stage.

The configuration having the shape reference designation means can provide a line-symmetrical figure that more conforms to a user's intention.

Finally, The configuration having the one-axis symmetrizing means can shape an input figure into a line-symmetrical figure with respect to one symmetry axis candidate even whether the input figure is not symmetrical with respect to a symmetry axis candidate pair, resulting in increased number of figures that can be shaped into a line-symmetrical figure.

What is claimed is:

1. A method for shaping an input figure into a line-symmetrical figure, comprising the steps of:
   a) extracting feature data from the input figure, the feature data including position data of apexes of the input figure;
   b) judging whether a number of the apexes is an even number;
   c) generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;
   d) generating symmetry axis judgment segments each connecting each of pairs of points on the input figure on both sides of each of the two symmetry axis candidates of a selected symmetry axis candidate pair selected one by one from the symmetry axis candidate pairs;
   e) calculating distance differences between one of the two symmetry axis candidates of the selected symmetry axis candidate pair and middle points of the symmetry judgment segments generated for the one of the two symmetry axis candidates, respectively;
   f) calculating angular differences between a right angle and angles which the symmetry judgment segments generated for the one of the two symmetry axis candidates form with the one of the two symmetry axis candidates, respectively;
   g) judging whether the input figure is approximately symmetrical with respect to the two symmetry axis candidates based on the distance differences and the angular differences; and
   h) shaping the input figure such that the input figure becomes completely line-symmetrical with respect to the two symmetry axis candidates when the input figure is judged to be symmetrical with respect to the two symmetry axis candidates.

2. The method according to claim 1, wherein the step (c) comprises the step of:
   generating line segments approximately orthogonal to each other as the two symmetry axis candidates such that each of the line segments connects one of a pair of apexes opposed to each other, a pair of middle points of sides opposed to each other, and a pair of an apex and a middle point of a side opposed to the apex.

3. The method according to claim 1, wherein the step (d) comprises the steps of:
   selecting the selected symmetry axis candidate pair comprising the two symmetry axis candidates one by one from the symmetry axis candidate pairs;
   generating pairs of apexes corresponding to each other which are located on both sides of each of the two symmetry axis candidates from one intersection point to the other intersection point where each of the two symmetry axis candidates intersects the input figure; and
   generating straight line segments as the symmetry axis judgment segments such that the straight line segments connect the pairs of apexes, respectively.

4. The method according to claim 1, wherein the step (g) comprises the steps of:
   calculating a first average of the distance differences and a second average of the angular differences; and
   judging the input figure to be approximately symmetrical with respect to the two symmetry axis candidates when each of the first and second averages falls within a predetermined range.

5. The method according to claim 1, wherein the step (g) comprises the steps of:
   calculating a first variance of the distance differences and a second variance of the angular differences; and
   judging the input figure to be symmetrical with respect to the two symmetry axis candidates when each of the first and second variances falls within a predetermined range.

6. The method according to claim 1, wherein the step (h) comprises the step of:
   changing the feature data so as to map the apex positions on a predetermined quadrant of a plain defined by the two symmetry axis candidates to those on the other quadrants when the input figure is judged to be symmetrical with respect to the two symmetry axis candidates.

7. The method according to claim 1, wherein a first symmetry axis candidate pair which is first judged to provide symmetry is used to shape the input figure.

8. The method according to claim 2, wherein a first symmetry axis candidate pair which is first judged to provide symmetry is used to shape the input figure.

9. The method according to claim 3, wherein a first symmetry axis candidate pair which is first judged to provide symmetry is used to shape the input figure.

10. The method according to claim 1, wherein the step (d) comprises the steps of:
   judging whether the symmetry axis candidate pairs include a symmetry axis candidate pair including at least one of a horizontal symmetry axis candidate and a vertical symmetry axis candidate which appear horizontal and vertical on screen, respectively;
   selecting the symmetry axis candidate pair including at least one of the horizontal symmetry axis candidate and the vertical symmetry axis candidate as the selected symmetry axis candidate with preference;
   generating pairs of apexes that are located on both sides of each of the two symmetry axis candidates from one intersection point to the other intersection point where the symmetry axis candidate intersects the input figure; and
   generating straight line segments as the symmetry axis judgment segments such that the straight line segments connect the pairs of apexes, respectively.

11. The method according to claim 1, wherein:
   the step (g) comprises the steps of:
     judging whether each of the two symmetry axis candidates enables symmetry shaping of the input figure based on the distance differences and the angular differences; and
     selecting an optimum symmetry axis candidate pair from symmetry axis candidate pairs which are judged to enable symmetry shaping of the input figure according to variations of the distance differences and the angular differences, and
   the step (h) comprises the step of:
     shaping the input figure such that the input figure becomes completely line-symmetrical with respect to the optimum symmetry axis candidate pair.

12. The method according to claim 11, wherein:
   the step (g) comprises the steps of:
     calculating a first average of the distance differences and a second average of the angular differences for each of the two symmetry axis candidates;
     judging whether each of the two symmetry axis candidates enables symmetry shaping of the input figure when each of the first and second averages falls within a predetermined range; and
     selecting an optimum symmetry axis candidate pair from symmetry axis candidate pairs which are judged to enable symmetry shaping of the input figure according to variations of the first and second averages, and
   the step (h) comprises the step of:
     shaping the input figure such that the input figure becomes completely line-symmetrical with respect to the optimum symmetry axis candidate pair.

13. The method according to claim 11, wherein:
   the step (g) comprises the steps of:
     calculating a first variance of the distance differences and a second variance of the angular differences for each of the two symmetry axis candidates;
     judging whether each of the two symmetry axis candidates enables symmetry shaping of the input figure when each of the first and second variances falls within a predetermined range; and
     selecting an optimum symmetry axis candidate pair from symmetry axis candidate pairs which are judged to enable symmetry shaping of the input figure according to variations of the first and second variances, and
   the step (h) comprises the step of:
     shaping the input figure such that the input figure becomes completely line-symmetrical with respect to the optimum symmetry axis candidate pair.

14. The method according to claim 11, wherein the step (h) comprises the step of:
   changing the feature data so as to map the apex positions on a predetermined quadrant of a plain defined by the optimum symmetry axis candidate pair to those on the other quadrants.

15. The method according to claim 11, wherein the step (d) comprises the steps of:
   judging whether the symmetry axis candidate pairs include a symmetry axis candidate pair including at least one of a horizontal symmetry axis candidate and a vertical symmetry axis candidate which appear horizontal and vertical on screen, respectively;
   selecting the symmetry axis candidate pair including at least one of the horizontal symmetry axis candidate and the vertical symmetry axis candidate as the selected symmetry axis candidate with preference;
   generating pairs of apexes that are located on both sides of each of the two symmetry axis candidates from one intersection point to the other intersection point where the symmetry axis candidate intersects the input figure; and
   generating straight line segments as the symmetry axis judgment segments such that the straight line segments connect the pairs of apexes, respectively.

16. A method for shaping an input figure into a line-symmetrical figure, comprising the steps of:
   a) extracting feature data from the input figure, the feature data including position data of apexes of the input figure;
   b) judging whether a number of the apexes is an even number;
   c) generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;
   d) generating symmetry axis judgment segments each connecting each of pairs of points on the input figure on both sides of each of the two symmetry axis candidates of a selected symmetry axis candidate pair selected one by one from the symmetry axis candidate pairs;
   e) calculating a distance difference between one of the two symmetry axis candidates of the selected symmetry axis candidate pair and a middle point of a symmetry judgment segment sequentially selected from the symmetry judgment segments;
   f) calculating an angular difference between a right angle and an angle which the symmetry judgment segment forms with the one of the two symmetry axis candidates;
   g) judging whether each of the distance difference and the angular difference falls within a predetermined range;

h) storing the distance difference and the angular difference for the symmetry judgment segment when each of the distance difference and the angular difference falls within the predetermined range, and otherwise going back to the step (d) with selecting a next symmetry axis candidate pair;

i) repeating the steps (e) to (h) until all the symmetry judgment segments have been selected;

j) judging whether the input figure is symmetrical with respect to the symmetry axis candidate pair based on both distance differences and angular differences which are stored by the step (h) when all the symmetry judgment segments have been selected; and k) shaping the input figure such that the input figure becomes completely line-symmetrical with respect to the symmetry axis candidate pair when the input figure is symmetrical with respect to the symmetry axis candidate pair.

17. The method according to claim 16, wherein the step (c) comprises the steps of:

generating a combination of a first line segment and a second line segment as the two symmetry axis candidates such that the first line segment connects a pair of apexes opposed to each other, the second line segment connects a pair of middle points of sides opposed to each other, and the first line segment and the second line segment being approximately orthogonal to each other.

18. The method according to claim 17, wherein the step (d) comprises the steps of:

selecting the selected symmetry axis candidate pair comprising the two symmetry axis candidates one by one from the symmetry axis candidate pairs;

generating pairs of apexes corresponding to each other which are located on both sides of each of the two symmetry axis candidates from one intersection point to the other intersection point where each of the two symmetry axis candidates intersects the input figure; and generating straight line segments as the symmetry axis judgment segments such that the straight line segments connect the pairs of apexes, respectively.

19. The method according to claim 16, wherein the step (j) comprises the steps of:

calculating a first average of the distance differences and a second average of the angular differences; and judging the input figure to be symmetrical with respect to the symmetry axis candidate pair when each of the first and second averages falls within a predetermined range.

20. The method according to claim 16, wherein the step (j) comprises the steps of:

calculating a first variance of the distance differences and a second variance of the angular differences; and judging the input figure to be symmetrical with respect to the symmetry axis candidate pair when each of the first and second variances falls within a predetermined range.

21. The method according to claim 16, wherein the step (k) comprises the step of:

changing the feature data so as to map the apex positions on a predetermined quadrant of a plain defined by the two symmetry axis candidates to those on the other quadrants when the input figure is judged to be symmetrical with respect to the two symmetry axis candidates.

22. The method according to claim 16, wherein a first symmetry axis candidate pair which is first judged to provide symmetry is used to shape the input figure.

23. The method according to claim 16, wherein the step (d) comprises the steps of:

judging whether the symmetry axis candidate pairs include a symmetry axis candidate pair including at least one of a horizontal symmetry axis candidate and a vertical symmetry axis candidate which appear horizontal and vertical on screen, respectively;

selecting the symmetry axis candidate pair including at least one of the horizontal symmetry axis candidate and the vertical symmetry axis candidate as the selected symmetry axis candidate with preference;

generating pairs of apexes that are located on both sides of each of the two symmetry axis candidates from one intersection point to the other intersection point where the symmetry axis candidate intersects the input figure; and generating straight line segments as the symmetry axis judgment segments such that the straight line segments connect the pairs of apexes, respectively.

24. The method according to claim 16, wherein:

the step (j) comprises the steps of:

judging whether each of the two symmetry axis candidates enables symmetry shaping of the input figure based on the distance differences and the angular differences; and selecting an optimum symmetry axis candidate pair from symmetry axis candidate pairs which are judged to enable symmetry shaping of the input figure according to variations of the distance differences and the angular differences, and the step (k) comprises the step of:

shaping the input figure such that the input figure becomes completely line-symmetrical with respect to the optimum symmetry axis candidate pair.

25. The method according to claim 24, wherein:

the step (j) comprises the steps of:

calculating a first average of the distance differences and a second average of the angular differences for each of the two symmetry axis candidates;

judging whether each of the two symmetry axis candidates enables symmetry shaping of the input figure when each of the first and second averages falls within a predetermined range; and selecting an optimum symmetry axis candidate pair from symmetry axis candidate pairs which are judged to enable symmetry shaping of the input figure according to variations of the first and second averages, and the step (k) comprises the step of:

shaping the input figure such that the input figure becomes completely line-symmetrical with respect to the optimum symmetry axis candidate pair.

26. The method according to claim 24, wherein:

the step (j) comprises the steps of:

calculating a first variance of the distance differences and a second variance of the angular differences for each of the two symmetry axis candidates;

judging whether each of the two symmetry axis candidates enables symmetry shaping of the input figure when each of the first and second variances falls within a predetermined range; and selecting an optimum symmetry axis candidate pair from symmetry axis candidate pairs which are judged to enable symmetry shaping of the input figure according to variations of the first and second variances, and the step (k) comprises the step of:

shaping the input figure such that the input figure becomes completely line-symmetrical with respect to the optimum symmetry axis candidate pair.

27. The method according to claim 24, wherein the step (k) comprises the step of:

changing the feature data so as to map the apex positions on a predetermined quadrant of a plain defined by the optimum symmetry axis candidate pair to those on the other quadrants.

28. The method according to claim 24, wherein the step (d) comprises the steps of:

judging whether the symmetry axis candidate pairs include a symmetry axis candidate pair including at least one of a horizontal symmetry axis candidate and a vertical symmetry axis candidate which appear horizontal and vertical on screen, respectively;

selecting the symmetry axis candidate pair including at least one of the horizontal symmetry axis candidate and the vertical symmetry axis candidate as the selected symmetry axis candidate with preference;

generating pairs of apexes that are located on both sides of each of the two symmetry axis candidates from one intersection point to the other intersection point where the symmetry axis candidate intersects the input figure; and generating straight line segments as the symmetry axis judgment segments such that the straight line segments connect the pairs of apexes, respectively.

29. The method according to claim 1, wherein the step (h) comprises the steps of:

receiving a shaping element instruction from a user; and shaping the input figure according to the shaping element instruction such that the input figure becomes completely line-symmetrical with respect to the symmetry axis candidate pair when the symmetry axis candidate pair is judged to provide line symmetry.

30. The method according to claim 11, wherein the step (h) comprises the steps of:

receiving a shaping element instruction from a user; and shaping the input figure according to the shaping element instruction such that the input figure becomes completely line-symmetrical with respect to the optimum symmetry axis candidate pair when the symmetry axis candidate pair is judged to provide line symmetry.

31. The method according to claim 16, wherein the step (k) comprises the steps of:

receiving a shaping element instruction from a user; and shaping the input figure according to the shaping element instruction such that the input figure becomes completely line-symmetrical with respect to the symmetry axis candidate pair when the symmetry axis candidate pair is judged to provide line symmetry.

32. The method according to claim 24, wherein the step (k) comprises the steps of:

receiving a shaping element instruction from a user; and shaping the input figure according to the shaping element instruction such that the input figure becomes completely line-symmetrical with respect to the optimum symmetry axis candidate pair when the symmetry axis candidate pair is judged to provide line symmetry.

33. A method for determining a symmetry axis pair of an input figure, comprising the steps of:

extracting feature data from the input figure, the feature data including position data of apexes of the input figure;

judging whether a number of the apexes is an even number;

generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;

generating symmetry axis judgment segments each connecting each of pairs of points on the input figure on both sides of each of the two symmetry axis candidates of a selected symmetry axis candidate pair selected one by one from the symmetry axis candidate pairs;

calculating distance differences between one of the two symmetry axis candidates of the selected symmetry axis candidate pair and middle points of the symmetry judgment segments generated for the one of the two symmetry axis candidates, respectively;

calculating angular differences between a right angle and angles which the symmetry judgment segments generated for the one of the two symmetry axis candidates form with the one of the two symmetry axis candidates, respectively; and determining the symmetry axis candidate pair as the symmetry axis pair of the input figure based on the distance differences and the angular differences.

34. A method for determining a symmetry axis pair of an input figure, comprising the steps of:

extracting feature data from the input figure, the feature data including position data of apexes of the input figure;

judging whether a number of the apexes is an even number;

generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;

generating symmetry axis judgment segments each connecting each of pairs of points on the input figure on both sides of each of the two symmetry axis candidates of a selected symmetry axis candidate pair selected one by one from the symmetry axis candidate pairs;

calculating distance differences between one of the two symmetry axis candidates of the selected symmetry axis candidate pair and middle points of the symmetry judgment segments generated for the one of the two symmetry axis candidates, respectively;

calculating angular differences between a right angle and angles which the symmetry judgment segments generated for the one of the two symmetry axis candidates form with the one of the two symmetry axis candidates, respectively;

judging whether each of the two symmetry axis candidates enables symmetry shaping of the input figure based on the distance differences and the angular differences;

selecting an optimum symmetry axis candidate pair from symmetry axis candidate pairs which are judged to enable symmetry shaping of the input figure according to variations of the distance differences and the angular differences; and determining the optimum symmetry axis candidate pair as the symmetry axis pair of the input figure.

35. A method for determining a symmetry axis of an input figure, comprising the steps of:

a) extracting feature data from the input figure, the feature data including position data of apexes of the input figure;

b) judging whether a number of the apexes is an even number;

c) generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;

d) generating symmetry axis judgment segments each connecting each of pairs of points on the input figure on both sides of each of the two symmetry axis candidates of a selected symmetry axis candidate pair selected one by one from the symmetry axis candidate pairs;

e) calculating a distance difference between one of the two symmetry axis candidates of the selected symmetry axis candidate pair and a middle point of a Symmetry judgment segment sequentially selected from the symmetry judgment segments;

f) calculating an angular difference between a right angle and an angle which the symmetry judgment segment forms with the one of the two symmetry axis candidates;

g) judging whether each of the distance difference and the angular difference falls within a predetermined range;

h) storing the distance difference and the angular difference for the symmetry judgment segment when each of the distance difference and the angular difference falls within the predetermined range, and otherwise going back to the step (d) with selecting a next symmetry axis candidate pair;

i) repeating the steps (e) to (h) until all the symmetry judgment segments have been selected; and j) determining the symmetry axis candidate pair as the symmetry axis pair of the input figure based on both distance differences and angular differences which are stored by the step (h) when all the symmetry judgment segments have been selected.

36. The method according to claim 35, wherein:

the step (i) comprises the steps of:

judging whether each of the two symmetry axis candidates enables symmetry shaping of the input figure based on the distance differences and the angular differences;

selecting an optimum symmetry axis candidate pair from symmetry axis candidate pairs which are judged to enable symmetry shaping of the input figure according to variations of the distance differences and the angular differences; and determining the optimum symmetry axis candidate pair as the symmetry axis pair of the input figure.

37. The method according to claim 1, wherein:

the step (g) comprises the steps of:

judging whether the input figure is approximately symmetrical with respect to one of the two symmetry axis candidates based on the distance differences and the angular differences; and judging whether the input figure is approximately symmetrical with respect to the other of the two symmetry axis candidates based on the distance differences and the angular differences, and the step (h) comprises the steps of:

shaping the input figure such that the input figure becomes completely line-symmetrical with respect to the two symmetry axis candidates when the input figure is judged to be symmetrical with respect to the two symmetry axis candidates; and shaping the input figure such that the input figure becomes completely line-symmetrical with respect to one of the two symmetry axis candidates when the input figure is judged to be symmetrical with respect to the one of the two symmetry axis candidates.

38. The method according to claim 10, wherein:

the step (g) comprises the steps of:

judging whether the input figure is approximately symmetrical with respect to one of the two symmetry axis candidates based on the distance differences and the angular differences; and judging whether the input figure is approximately symmetrical with respect to the other of the two symmetry axis candidates based on the distance differences and the angular differences, and the step (h) comprises the steps of:

shaping the input figure such that the input figure becomes completely line-symmetrical with respect to the two symmetry axis candidates when the input figure is judged to be symmetrical with respect to the two symmetry axis candidates; and shaping the input figure such that the input figure becomes completely line-symmetrical with respect to one of the two symmetry axis candidates when the input figure is judged to be symmetrical with respect to the one of the two symmetry axis candidates.

39. The method according to claim 11, wherein:

the step (g) comprises the steps of:

judging whether the input figure is approximately symmetrical with respect to one of the two symmetry axis candidates based on the distance differences and the angular differences;

judging whether the input figure is approximately symmetrical with respect to the other of the two symmetry axis candidates based on the distance differences and the angular differences; and selecting an optimum symmetry axis candidate pair from symmetry axis candidate pairs which are judged to enable symmetry shaping of the input figure according to variations of the distance differences and the angular differences; and selecting an optimum symmetry axis candidate from symmetry axis candidates which are judged to enable symmetry shaping of the input figure according to variations of the distance differences and the angular differences, and the step (h) comprises the step of:

shaping the input figure such that the input figure becomes completely line-symmetrical with respect to the optimum symmetry axis candidate pair; and shaping the input figure such that the input figure becomes completely line-symmetrical with respect to the optimum symmetry axis candidate.

40. A line-symmetrical figure shaping system comprising a program-controlled processor implementing the method according to claim 1.

41. A line-symmetrical figure shaping system comprising a program-controlled processor implementing the method according to claim 11.

42. A line-symmetrical figure shaping system comprising a program-controlled processor implementing the method according to claim 16.

43. A line-symmetrical figure shaping system comprising a program-controlled processor implementing the method according to claim 24.

44. A line-symmetrical figure shaping system comprising:

extracting means for extracting feature data from the input figure, the feature data including position data of apexes of the input figure;

first judging means for judging whether a number of the apexes is an even number;

first generating means for generating symmetry axis candidate pairs based on the feature data when the number of the apexes is an even number, each of the symmetry axis candidate pairs comprising two symmetry axis candidates which possibly become orthogonal to each other, and each of the two symmetry axis candidates passing through at least one of the apexes and middle points of sides forming the input figure;

second generating means for generating symmetry axis judgment segments each connecting each of pairs of points on the input figure on both sides of each of the two symmetry axis candidates of a selected symmetry axis candidate pair selected one by one from the symmetry axis candidate pairs;

distance calculating means for calculating distance differences between one of the two symmetry axis candidates of the selected symmetry axis candidate pair and middle points of the symmetry judgment segments generated for the one of the two symmetry axis candidates, respectively;

angle calculating means for calculating angular differences between a right angle and angles which the symmetry judgment segments generated for the one of the two symmetry axis candidates form with the one of the two symmetry axis candidates, respectively;

second judging means for judging whether the input figure is approximately symmetrical with respect to the two symmetry axis candidates based on the distance differences and the angular differences; and shaping means for shaping the input figure such that the input figure becomes completely line-symmetrical with respect to the two symmetry axis candidates when the input figure is judged to be symmetrical with respect to the two symmetry axis candidates.

* * * * *